United States Patent
Kim et al.

(10) Patent No.: US 11,908,176 B2
(45) Date of Patent: Feb. 20, 2024

(54) DATA RECOGNITION MODEL CONSTRUCTION APPARATUS AND METHOD FOR CONSTRUCTING DATA RECOGNITION MODEL THEREOF, AND DATA RECOGNITION APPARATUS AND METHOD FOR RECOGNIZING DATA THEREOF

(71) Applicant: SAMSUNG ELECTRONICS CO., LTD., Suwon-si (KR)

(72) Inventors: Ji-man Kim, Suwon-si (KR); Chan-jong Park, Seoul (KR); Do-jun Yang, Yongin-si (KR); Hyun-woo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 17/246,147

(22) Filed: Apr. 30, 2021

(65) Prior Publication Data

US 2021/0256264 A1     Aug. 19, 2021

Related U.S. Application Data

(63) Continuation of application No. 15/802,661, filed on Nov. 3, 2017, now Pat. No. 11,023,731.

(30) Foreign Application Priority Data

Nov. 3, 2016   (KR) .................. 10-2016-0145748
Aug. 17, 2017  (KR) .................. 10-2017-0104312

(51) Int. Cl.
*G06V 10/776*   (2022.01)
*G06V 20/40*    (2022.01)
(Continued)

(52) U.S. Cl.
CPC .......... *G06V 10/776* (2022.01); *G06F 18/214* (2023.01); *G06F 18/217* (2023.01);
(Continued)

(58) Field of Classification Search
CPC .... G06N 3/0454; G06N 3/04; G06K 9/00718; G06K 9/00979; G06K 9/6262; G06K 9/00724; G06K 9/6256; Y04S 10/54
See application file for complete search history.

(56) References Cited

U.S. PATENT DOCUMENTS 8,300,924 B2   10/2012   Eaton et al.
8,345,984 B2    1/2013   Ji et al.
(Continued)

FOREIGN PATENT DOCUMENTS

CN   105912999 A    8/2016
JP   2005-267407 A  9/2005
(Continued)

OTHER PUBLICATIONS

Communication dated Oct. 9, 2019, issued by the European Patent Office in counterpart European Application No. 17867457.8.
(Continued)

*Primary Examiner* — Mark Roz
(74) *Attorney, Agent, or Firm* — Sughrue Mion, PLLC

(57) ABSTRACT

Disclosed is a data recognition model construction apparatus. The data recognition model construction apparatus includes a video inputter configured to receive a video, an image composition unit configured to, based on a common area included in each of a plurality of images that form at least a portion of the video, generate a composition image by overlaying at least a portion of the plurality of images, a learning data inputter configured to receive the generated composition image, a model learning unit configured to make a data recognition model learn using the generated
(Continued)

composition image, and a model storage configured to store the learnt data recognition model.

12 Claims, 18 Drawing Sheets

(51) Int. Cl.
  *G06V 10/94* (2022.01)
  *G06F 18/214* (2023.01)
  *G06F 18/21* (2023.01)
  *G06N 3/045* (2023.01)
  *G06V 10/774* (2022.01)
  *G06N 3/04* (2023.01)

(52) U.S. Cl.
  CPC .............. *G06N 3/04* (2013.01); *G06N 3/045* (2023.01); *G06V 10/774* (2022.01); *G06V 10/95* (2022.01); *G06V 20/41* (2022.01); *G06V 20/42* (2022.01)

(56) References Cited

U.S. PATENT DOCUMENTS

| | | | |
|---|---|---|---|
| 8,477,998 | B1 | 7/2013 | Kim et al. |
| 8,620,028 | B2 | 12/2013 | Eaton et al. |
| 8,705,861 | B2 | 4/2014 | Eaton et al. |
| 8,923,609 | B2 | 12/2014 | Eaton et al. |
| 9,094,615 | B2 | 7/2015 | Aman et al. |
| 9,843,724 | B1 | 12/2017 | Brailovskiy |
| 2012/0141094 | A1 | 6/2012 | Ryoo et al. |
| 2013/0301876 | A1 | 11/2013 | Hugosson |
| 2014/0093122 | A1 | 4/2014 | Rabinowitz |
| 2015/0019214 | A1 | 1/2015 | Wang et al. |
| 2015/0324655 | A1 | 11/2015 | Chalasani |
| 2016/0034748 | A1 | 2/2016 | Wang et al. |
| 2016/0124513 | A1 | 5/2016 | Dal Zot et al. |
| 2016/0133254 | A1 | 5/2016 | Vogel et al. |
| 2016/0217387 | A1 | 7/2016 | Okanohara et al. |
| 2016/0300111 | A1 | 10/2016 | Cosatto |
| 2016/0328643 | A1 | 11/2016 | Liu |

FOREIGN PATENT DOCUMENTS

| | | |
|---|---|---|
| KR | 1020160096460 A | 8/2016 |
| WO | 2011/159258 A1 | 12/2011 |

OTHER PUBLICATIONS

Guo, K., et al., "Action Recognition in Video by Covariance Matching of Silhouette Tunnels", Oct. 11, 2009, XXII Brazilian Symposium on Computer Graphics and Image Processing, XP031616889, p. 299-306, 8 pages total.
International Search Report, issued by International Searching Authority in corresponding International Application No. PCT/KR2017/012275, dated Mar. 9, 2018 (PCT/ISA/210).
Written Opinion issued by the International Searching Authority in corresponding International Application No. PCT/KR2017/012275, dated Mar. 9, 2018 (PCT/ISA/237).
Communication dated Sep. 16, 2020 issued by the European Patent Office in application No. 17867457.8.
Madan, Visualizing and quantifying movement from pre-recorded videos: The spectral time-lapse (STL) algorithm, F1000 Research Jan. 2014 (Year: 2014).
Communication dated Jul. 13, 2021, issued by the Korean Intellectual Property Office in Korean Application No. 10-2017-0104312.
Communication dated Nov. 1, 2022 by the China National Intellectual Property Administration in Chinese Patent Application No. 201780067877.4.
Kai Guo et al., "Action Recognition in Video by Covariance Match of Silhouette Tunnels", Oct. 11-15, 2009, IEEE Xplore, INSPEC Accession No. 11134017, 9 Pages Total.
Communication dated Mar. 24, 2022 issued by the European Patent Office in European Patent Application No. 17867457.8.
Communication dated Dec. 6, 2021, issued by Intellectual Property India in Indian Patent Application No. 201917021798.
Communication dated Jan. 28, 2022, issued by the Korean Intellectual Property Office in Korean Patent Application No. 10-2017-0104312.
Communication dated Jun. 2, 2023, issued by National Intellectual Property Administration of P.R. China in Chinese Patent Application No. 201780067877.4.
Communication dated Nov. 10, 2023 by the China National Intellectual Property Administration in Chinese Patent Application No. 201780067877.4.
Communication dated Dec. 5, 2023 by the European Patent Office in European Patent Application No. 17867457.8.

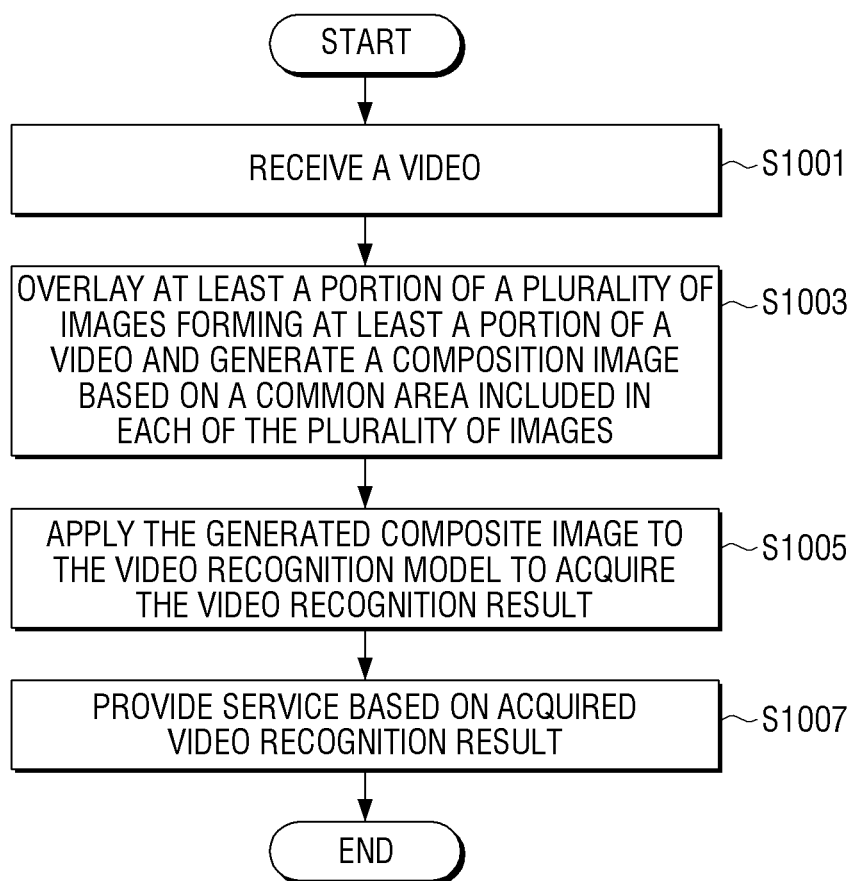

DATA RECOGNITION MODEL CONSTRUCTION APPARATUS AND METHOD FOR CONSTRUCTING DATA RECOGNITION MODEL THEREOF, AND DATA RECOGNITION APPARATUS AND METHOD FOR RECOGNIZING DATA THEREOF

CROSS-REFERENCE TO RELATED APPLICATIONS

This application is a Continuation Application of U.S. application Ser. No. 15/802,661, filed on Nov. 3, 2017, which claims priority from Korean Patent Application No. 10-2016-0145748, filed on Nov. 3, 2016, and Korean Patent Application No. 10-2017-0104312, filed on Aug. 17, 2017, in the Korean Intellectual Property Office, the disclosures of which are incorporated herein by reference in their entireties.

BACKGROUND

1. Field

Apparatuses and methods consistent with exemplary embodiments relate to a display apparatus and an image composition method thereof, and more particularly, to an apparatus constructing data recognition model using learning data and a method thereof. In addition, the present disclosure relates to an apparatus which recognizes data using constructed data recognition model and a method thereof.

The present disclosure pertains to an artificial intelligence (AI) system to utilize machine learning algorithm such as deep learning to simulate functions such as recognition and determination of human brain and the like, and an application thereof.

2. Description of the Related Art

With development of information devices such as a computer and a smartphone, digital computer application and digital signal processing technologies have been developed.

In particular, recent technologies such as artificial intelligence image recognition (video/motion recognition), deep learning (deep learning), and machine learning have been developed, and intelligent service that automatically recognizes data such as voice, image, video, or text and provides information related to data or provide services related to data is used in various fields.

An artificial intelligence system is a computer system that implements human-level intelligence, and unlike the existing rule-based smart systems, a machine learns, judges, and becomes smart. The more the artificial intelligence systems are used, the recognition capabilities of the system are further improved and user preferences are more accurately identified and thus, existing rule-based smart systems are increasingly being replaced by deep-learning-based artificial intelligence systems.

Artificial intelligence technology is composed of machine learning (for example, deep learning) and element technology utilizing machine learning.

Machine learning is an algorithm technology that classifies/learns the characteristics of input data by itself. Element technology is technology that simulates functions such as recognition and judgment of the human brain using a machine learning algorithm such as deep learning. The element technology is composed of linguistic understanding, visual understanding, reasoning/prediction, knowledge representation, and motion control.

Various fields in which artificial intelligence technology is applied are as follows. Linguistic understanding is a technology for recognizing, applying, and processing human language/characters, including natural language processing, machine translation, dialogue system, question and answer, speech recognition/synthesis, and the like. Visual understanding is a technology to recognize and process objects as human vision, including object recognition, object tracking, image search, human recognition, scene understanding, spatial understanding, and image enhancement. Reasoning and prediction are a technology for judging information, and logically inferring and predicting information, including knowledge/probability based reasoning, optimization prediction, preference-based planning, and recommendation. Knowledge representation is a technology for automating human experience information into knowledge data, including knowledge building (data generation/classification) and knowledge management (data utilization). The motion control is a technology for controlling the autonomous travel of a vehicle and the motion of a robot, and includes motion control (navigation, collision, traveling), operation control (behavior control).

SUMMARY

Exemplary embodiments may overcome the above disadvantages and other disadvantages not described above. However, it is understood that the exemplary embodiments are not required to overcome the disadvantages described above, and may not overcome any of the problems described above.

In order to construct a data recognition model for recognizing data, learning data is required. In particular, when learning the data recognition model using a video, each of frames forming a video can be used as learning data.

In this case, when learning the data recognition model for the entire frames forming a video, a lot of information processing can be requested and a large capacity storage space where frames will be stored therein can be required.

In addition, each of frames is used as learning data, a data recognition model can be learnt while relevant information among frames is omitted.

Accordingly, the present disclosure is to shorten time required for learning, reduce storage space where learning data is stored, and provide an apparatus for learning in consideration of relevancy among frames and a method thereof.

In addition, the technical problems to be solved by the present disclosure is not limited to the above-mentioned technical problems, and other technical objects which are not mentioned are to be understood to those skilled in the art from the following description.

According to an aspect of exemplary embodiments, a data recognition model construction apparatus may include a video inputter configured to receive a video, an image composition unit configured to, based on a common area included in each of a plurality of images that form at least a portion of the video, generate a composition image by overlaying at least a portion of the plurality of images, a learning data inputter configured to receive the generated composition image, a model learning unit configured to make a data recognition model learn using the generated composition image, and a model storage configured to store the learnt data recognition model.

According to an aspect of exemplary embodiments, a data recognition apparatus may include a video inputter configured to receive a video, an image composition unit configured to, based on a common area included in each of a plurality of images that form at least a portion of the video, generate a composition image by overlaying at least a portion of the plurality of images, a recognition data inputter configured to receive the generated composition image, and a recognition result provider configured to apply the generated composition image to a data recognition model and provide a recognition result of the video.

According to an aspect of exemplary embodiments, an electronic apparatus may include a video inputter configured to receive a video, an image composition unit configured to, based on a common area included in each of a plurality of images that form at least a portion of the video, generate a composition image by overlaying at least a portion of the plurality of images, a recognition data inputter configured to receive the generated composition image, a recognition result provider configured to apply the generated composition image to a data recognition model and provide a recognition result of the video, and a service provider configured to provide a service based on the recognition result of the video.

According to an aspect of exemplary embodiments, a method for constructing a data recognition model by a data recognition model construction apparatus may include receiving a video, generating a composition image by overlaying at least a portion of the plurality of images based on a common area included in each of the plurality of images, learning a data recognition model using the generated composition image, and storing the learnt data recognition model.

According to an aspect of exemplary embodiments, a method for recognizing data by a data recognition apparatus may include receiving a video, generating a composition image by overlaying at least a portion of a plurality of images that form at least a portion of the video based on a common area included in each of the plurality of images, and applying the generated composition image to a data recognition model and providing a recognition result of the video.

According to an aspect of exemplary embodiments, a computer readable non-transitory recording medium according to an exemplary embodiment may store a program which enables an electronic apparatus to perform receiving a video, generating a composition image by overlaying at least a portion of the plurality of images based on a common area included in each of a plurality of images, learning a data recognition model using the generated composition image, and storing the learnt data recognition model.

According to an aspect of exemplary embodiments, a computer readable non-transitory recording medium according to an exemplary embodiment may store a program which enables an electronic apparatus to perform receiving a video, generating a composition image by overlaying at least a portion of a plurality of images that form at least a portion of the video based on a common area included in each of the plurality of images, and applying the generated composition image to a data recognition model and providing a recognition result of the video.

According to the present disclosure, by using a composition image as learning data, a data recognition model which considers relevant information among frames forming a video can be constructed.

In addition, not entire frames forming a video, but composition images where a plurality of frames are composed are used as learning data, time required for learning may be shortened and storage space for storing learning data can be saved.

In addition, the effects obtainable in the present disclosure are not limited to the effects mentioned, and other effects not mentioned are apparent from the following description to those skilled in the art to which the present disclosure belongs to.

BRIEF DESCRIPTION OF THE DRAWINGS

The above and/or other aspects will be more apparent by describing in detail exemplary embodiments with reference to the accompanying drawings, in which:

FIG. 10A is a flowchart indicating a method for providing a service by an electronic apparatus according to an exemplary embodiment.

DETAILED DESCRIPTION OF THE EXEMPLARY EMBODIMENTS

Figure 1A:
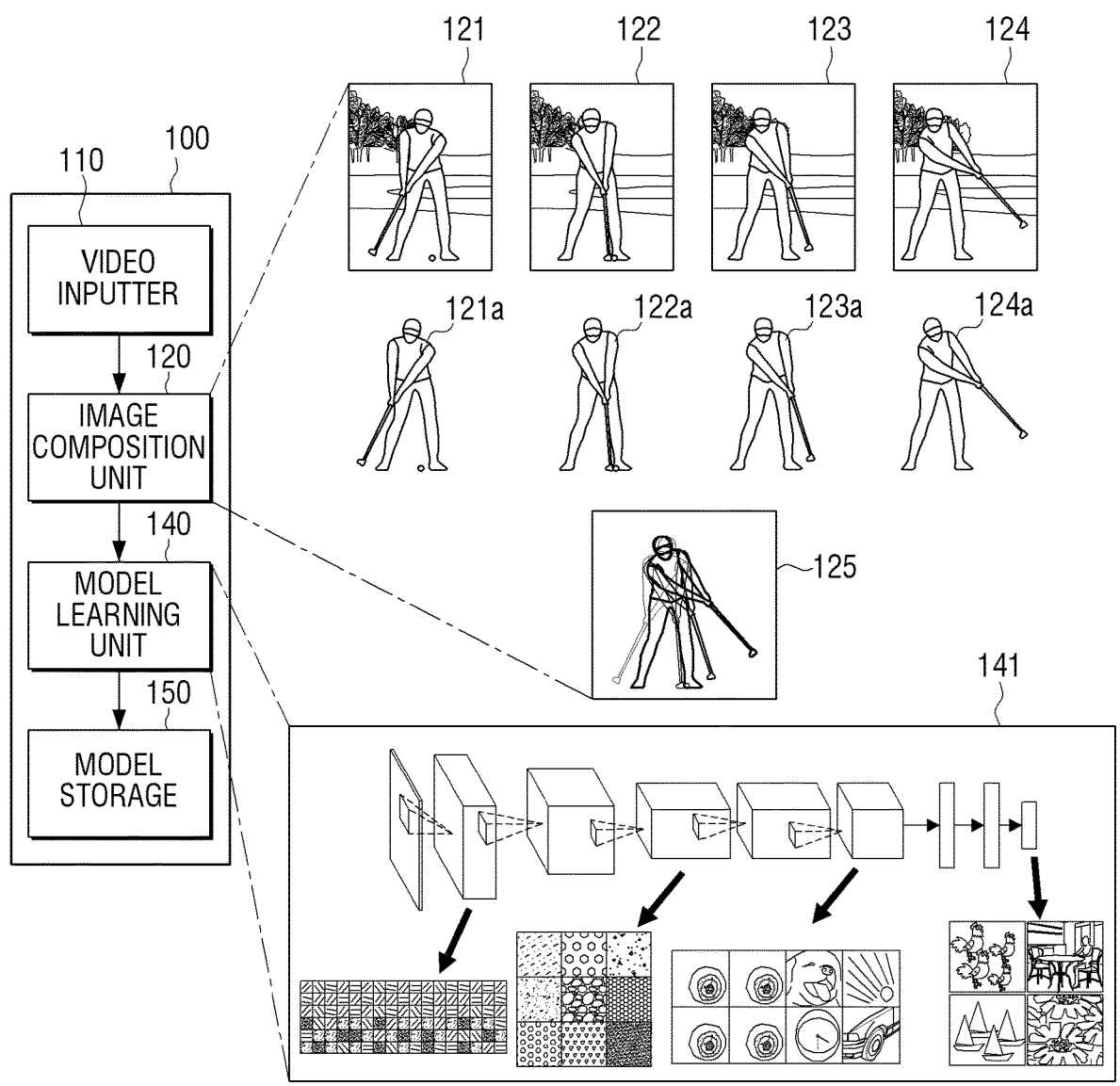
FIGS. 1A and 1B are block diagrams to describe data recognition model construction apparatuses according to exemplary embodiments.

Hereinafter, exemplary embodiments will be described in more detail with reference to the accompanying drawings.

In the following description, the same reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

The exemplary embodiments of the present disclosure may have a variety of modifications and several examples. Accordingly, while various exemplary embodiments are described in detail herein, these are not intended to limit the scope of the present disclosure to the particular exemplary embodiments only. Rather, it should be understood that the exemplary embodiments encompass all the modifications, equivalents or replacements that fall under the concept and technology scope as disclosed. In describing the example embodiments, well-known functions or constructions may not be described in detail when they obscure the disclosure with unnecessary detail. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the exemplary embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor.

An electronic apparatus according to various exemplary embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. A wearable device may include at least one of an accessory type (e.g., watch, ring, bracelet, ankle bracelet, necklace, glasses, contact lens, or head-mounted-device (HMD)), fabric or cloth-embedded type (e.g., e-cloth), body-attached type (e.g., skin pad or tattoo), or bioimplant circuit.

In some embodiments, an electronic apparatus may include, for example, at least one of television, digital video disk (DVD) player, audio, refrigerator, air-conditioner, cleaner, oven, microwave, washing machine, air cleaner, set top box, home automation control panel, security control panel, media box (e.g., Samsung HomeSync™, Apple TV™, or Google TV™), game console (e.g., Xbox™, PlayStation™), e-dictionary, e-key, camcorder, or e-frame.

In another exemplary embodiment, an electronic apparatus may include various medical devices (e.g., various portable medical measuring devices (blood glucose monitor, heart rate monitor, blood pressure measuring device, or body temperature measuring device, etc.), magnetic resonance angiography (MRA), magnetic resonance imaging (MRI), computed tomography (CT), photographing device, or ultrasonic device, etc.), navigator, global navigation satellite system (GNSS), event data recorder (EDR), flight data recorder (FDR), vehicle infotainment device, e-device for ships (e.g., navigation device for ship, gyrocompass, etc.), avionics, security device, head unit for vehicles, industrial or home-use robots, drone, ATM of financial institutions, point of sales (POS) of shops, or internet of things device (e.g., bulb, sensors, sprinkler, fire alarm, temperature controller, streetlight, toaster, sporting goods, hot water tank, heater, boiler, etc.). According to some exemplary embodiments, an electronic apparatus may include at least one of furniture, a part of a building/construction or vehicle, electronic board, electronic signature receiving device, projector, or various measuring devices (e.g., water, electricity, gas, or wave measuring device, etc.). In various exemplary embodiments an electronic apparatus may be flexible or be combination of two or more of the aforementioned various devices. The electronic apparatus according to an exemplary embodiment is not limited to the aforementioned devices. In this disclosure, the term "a user" may indicate a person using an electronic apparatus or an apparatus which uses an electronic apparatus (for example, artificial intelligent electronic apparatus).

At least a part of a data recognition model construction apparatus and at least a part of a data recognition apparatus to be described later in this disclosure may be implemented as a software module or a hardware chip and may be provided in the aforementioned electronic apparatuses. For example, the data recognition model construction apparatus and the data recognition apparatus may be fabricated in the form of a hardware chip exclusive for artificial intelligence (AI), or a conventional general purpose processor (e.g., a CPU or an application processor) or a graphics-only processor (e.g., a GPU) and mounted on various electronic apparatuses as described above. At this time, the hardware chip exclusive for artificial intelligence is a dedicated processor for probability calculation, and has higher parallel processing performance than a conventional general processor, thus enabling rapid computing works in the machine learning and artificial intelligence field. When the data recognition model construction apparatus and the data recognition apparatus are implemented as a software module (or a program module including an instruction), the software module may be stored in a computer-readable non-transitory computer readable media. Further, in this case, at least one software module may be provided by an operating system (OS) or by a predetermined application. Alternatively, some of the software modules may be provided by an operating system (OS), and some of the software modules may be provided by a predetermined application.

Hereinbelow, exemplary embodiments of the data recognition model construction apparatus and the data recognition apparatus will be described with reference to the drawings.

FIG. 1A is a block diagram of the data recognition model construction apparatus 100 according to an exemplary embodiment. The data recognition model construction apparatus 100 may learn criteria for identifying circumstances (e.g., image analysis) and construct a data recognition model. The data recognition model construction apparatus 100 may learn criteria regarding which data is to be used for identifying a predetermined circumstance, and how a circumstance is identified using data. The data recognition model construction apparatus 100 may learn criteria for identifying circumstances by obtaining data to be used for learning and applying the obtained data to a data recognition model to be described later.

A type of data which is inputted by the data recognition model construction apparatus 100 includes voice data, video data, text data, bio signal data, and so on, but it is not limited thereto, and may include all the data which can be classified using other recognition models.

In the meantime, video data (or video) will be explained as a main example.

Referring to FIG. 1A, the data recognition model construction apparatus 100 may include a video inputter 110, an image composition unit 120, a model learning unit 140, and a model storage 150. In the meantime, the aforementioned elements can be embodied as a software module or manufactured as a hardware module (for example, hardware chip), and two or more of the aforementioned elements can be embodied as one element and embodied as a software module or manufactured as a hardware module.

The video inputter 110 may receive a video. The video may include a plurality of images (or frames).

For example, the video inputter 110 may receive a video through a camera of an electronic apparatus where the data recognition model construction apparatus 100 is mounted, or an external camera (e.g., CCTV or black box, etc.) which is capable of communicating with the electronic apparatus where the data recognition model construction apparatus 100 is mounted. Here, the camera may include one or more image sensors (e.g., front sensor or back sensor), lens, image signal processor (ISP), or flash (e.g., LED or xenon lamp, etc.).

The image composition unit 120, based on a common area included in each of a plurality of images (or frames) forming at least a portion of an input video, may generate one composition image by overlaying at least a portion of the plurality of images. In this case, a plurality of composition images can be generated from one video.

The common area may be an area including identical or similar common objects (e.g., animal, plant, or people, etc.) from each of a plurality of images. Alternatively, the common area may be an area in which color, shadow, RGB value, or CMYK value of a plurality of images are identical or similar.

The aforementioned common area will be further described in the exemplary embodiments to be described below.

Referring back to FIG. 1A, the plurality of images can be first to fourth images 121, 122, 123, and 124.

In this case, the image composition unit 120 may extract a plurality of common areas 121a, 122a, 123a, and 124a from the first to fourth images 121-124. In this case, the common area may be an area which includes, for example, a person enjoying sports.

For example, the image composition unit 120 may determine a common object included in a plurality of images using segmentation technique, select a plurality of images in designated frame intervals (e.g., 10-60 frames per second), and extract a plurality of common areas including the common object from the plurality of selected images.

Alternatively, the image composition unit 120 may determine a common object included in a plurality of images by using segmentation technique, select a plurality of images of which a shape of the common object changes significantly, and extract a plurality of common areas including the common object from the plurality of selected images.

The image composition unit 120, by using a moving object detection technique, may determine a common area of which size of a motion is greater than or equal to a predetermined vector from a plurality of images, and extract a plurality of common areas from a plurality of images with predefined frame intervals (e.g., 10-60 frames per second).

The image composition unit 120, using a moving object detection technique, may determine a common area of which size of a motion is greater than or equal to a specific vector from a plurality of images, and extract a plurality of common areas from a plurality of images of which change of a motion is great.

In addition, a method of extracting common areas of the image composition unit 120 is not limited thereto, and a plurality of common areas can be extracted from a plurality of images using various area extracting techniques known to those skilled in the art.

When the plurality of common areas 121a-124a are extracted from the first to fourth images 121-124, the image composition unit 120 may generate the composition image 125 by overlaying the plurality of extracted common areas 121a-124a. In this case, the image composition unit 120 may process a background area excluding a common area extracted from the composition image 125 as a single color (e.g., black).

The model learning unit 140 of FIG. 1A may receive the composition image which is generated from the image composition unit 120 as learning data.

In addition, the model learning unit 140 may further receive, for example, voice data, image data, text data, or bio signal data, and the like.

Further, the model learning unit 140 may be further receive a classification result (or correct answer information) of a video corresponding to the composite image as learning data for learning of the data recognition model. In this case, the classification result of the video may be manually generated by a person, or may be automatically generated according to a conventional image processing technique. Alternatively, it may be automatically obtained from additional information (e.g., tags, metadata, review information, etc.) of the video.

The classification result of the video for learning of the data recognition model may be provided as text, voice, image, or the like. The classification result of the video may be, for example, status information of the included object (e.g., person) of the video, status information about the object, and the like. Specifically, the status information of the video may be status information of a person, such as during exercise, in an emergency, during a break, during a meal, or while sleeping, but is not limited to the above example.

For example, the model learning unit 140 may further receive additional learning data through an input device (e.g., microphone, camera, or sensor, etc.) of the electronic apparatus mounted with the data recognition apparatus 200 as well as the data recognition model construction apparatus 100. The model learning unit 140 may further receive additional learning data through an external device which communicates with an electronic apparatus mounted with the data recognition apparatus 200.

The model learning unit 140 may make a data recognition model learn using the received composition image.

In this case, the data recognition model may be a model that has been constructed already. For example, the data recognition model may be a model that has been constructed already by receiving basic learning data (e.g., sample image, etc.).

The data recognition model may be constructed in consideration of an application field of a recognition model, the purpose of learning, computer performance of an apparatus, or the like.

The data recognition model may be, for example, a model 141 based on neural network.

The data recognition model may be designed to simulate the human brain structure on a computer. The data recognition model may include a plurality of network nodes having a weighted value that simulate a neuron of a human neural network. The plurality of network nodes may respectively establish a connection relationship so that the neurons simulate synaptic activity of sending and receiving signals via synapses. The data recognition model may, for example, include a neural network model or a deep learning model developed from a neural network model. In the deep learning model, a plurality of network nodes are located at different depths (or layers), and data can be exchanged according to a convolution connection relationship. Models such as deep neural network (DNN), recurrent neural network (RNN), and bidirectional recurrent deep neural network (BRDNN) may be included in the data recognition model but are not particularly limited to the above examples.

According to various exemplary embodiments, when there are a plurality of pre-constructed data recognition models, the model learning unit 140 may determine a data recognition model in which relevance between the input composition image and the basic learning data is high as a data recognition model to be learnt. In this case, the basic learning data can be pre-classified by types of data, and the data recognition model can be pre-constructed by types of data. For example, the basic learning data can be pre-classified based on various criteria such as an area where learning data is generated, time when learning data is generated, size of learning data, genre of learning data, generator of learning data, and types of object within learning data, and so on.

According to various exemplary embodiments, the model learning unit 140 may learn the data recognition model using learning algorithm including, for example, error back-propagation or gradient descent.

When the data recognition model is learnt, the model storage 150 as illustrated in FIG. 1A may store the learnt data recognition model. In this case, the model storage 150 may store the learnt data recognition model in a memory of an electronic apparatus where the data recognition model construction apparatus 100 is mounted. Or, the model storage 150 may store the learnt data recognition model in a memory of an electronic apparatus where the data recognition apparatus 200 which is to be described later will be mounted. Alternatively, the model storage 150 may store the learnt data recognition model in a memory of a server which is located outside and is connected by wire or wirelessly.

In this case, the memory where the learnt data recognition model is stored can store, for example, a command or data which is related to at least one other element of an electronic apparatus. In addition, the memory can store software and/or program. The program may include, for example, kernel, middleware, application programing interface (API) and/or application program (or "application") or the like. A detailed example of memory will be described through the memory 750 of FIG. 7.

Figure 1B:
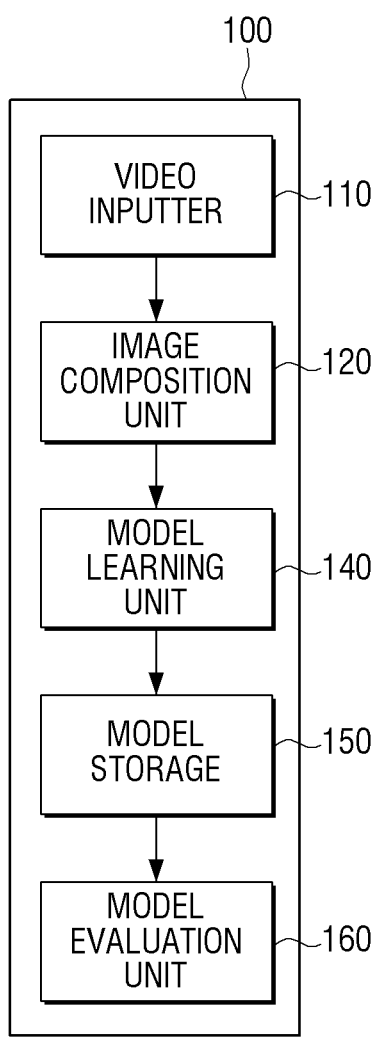

FIG. 1B is a block diagram of the data recognition model construction apparatus 100 according to another exemplary embodiment.

Referring to FIG. 1B, the data recognition model construction apparatus 100 may include the video inputter 110, the image composition unit 120, the model learning unit 140, the model storage 150, and a model evaluation unit 160.

In FIG. 1B, the video inputter 110, the image composition unit 120, the model learning unit 140, and the model storage 150 have been described in greater detail with reference to FIG. 1A and will not be further described.

The model evaluation unit 160 may input evaluation data to the learnt data recognition model, and may make the model learning unit 140 learn again when a recognition result which is output from the evaluation data does not satisfy predetermined criteria. In this case, the evaluation data can be a video itself or a composition image which is generated from the video.

For example, the model evaluation unit 160, from among the recognition result of the learnt data recognition model regarding the evaluation data, if the number or ratio of evaluation data of which recognition result is not correct exceeds a predetermined threshold value, may evaluate that the predetermined criteria is not satisfied. For example, if the predetermined criteria is defined as 2%, and incorrect recognition is output by the learnt data recognition model regarding evaluation data which exceeds 20 from among 1000 evaluation data, the model evaluation unit 160 may evaluate that the learnt data recognition model is not suitable.

In the meantime, if there are a plurality of learnt data recognition models, the model evaluation unit 160 may evaluate whether each learnt data recognition model satisfies predetermined criteria, and determine a model satisfying the predetermined criteria as a final data recognition model. In this case, when there are a plurality of models satisfying the predetermined criteria, the model evaluation unit 160 may determine one or a predetermined number of models which are preset in an order of high evaluation score as a final data recognition model.

According to various exemplary embodiments, the data recognition model construction apparatus 100 may include the video inputter 110 receiving a video, the image composition unit 120 which overlays at least a portion of a plurality of images forming at least a portion of the video and generates a composition image based on a common area included in each of the plurality of images the model learning unit 140 to learn the data recognition model using the composition image, and the model storage 150 storing the data recognition model.

According to various exemplary embodiments, the image composition unit 120 may generate a composition image by extracting a common area from each of a plurality of images and overlaying the extracted common areas.

According to various exemplary embodiments, the image composition unit 120 may generate a composition image based on the center of gravity of the common areas.

According to various exemplary embodiments, the image composition unit 120 may overlay a common area and a background area around the common area included in each of a plurality of images and generate a composition image.

According to various exemplary embodiments, the image composition unit 120 may compensate a motion of a camera which photographs a video from each of a plurality of images and generate a composition image based on a common area included in each of a plurality of images in which a motion of the camera is compensated.

According to various exemplary embodiments, the data recognition model construction apparatus 100 may further include the model evaluation unit 160 which evaluates the learnt data recognition model using a video or a composition image.

Figure 2A:
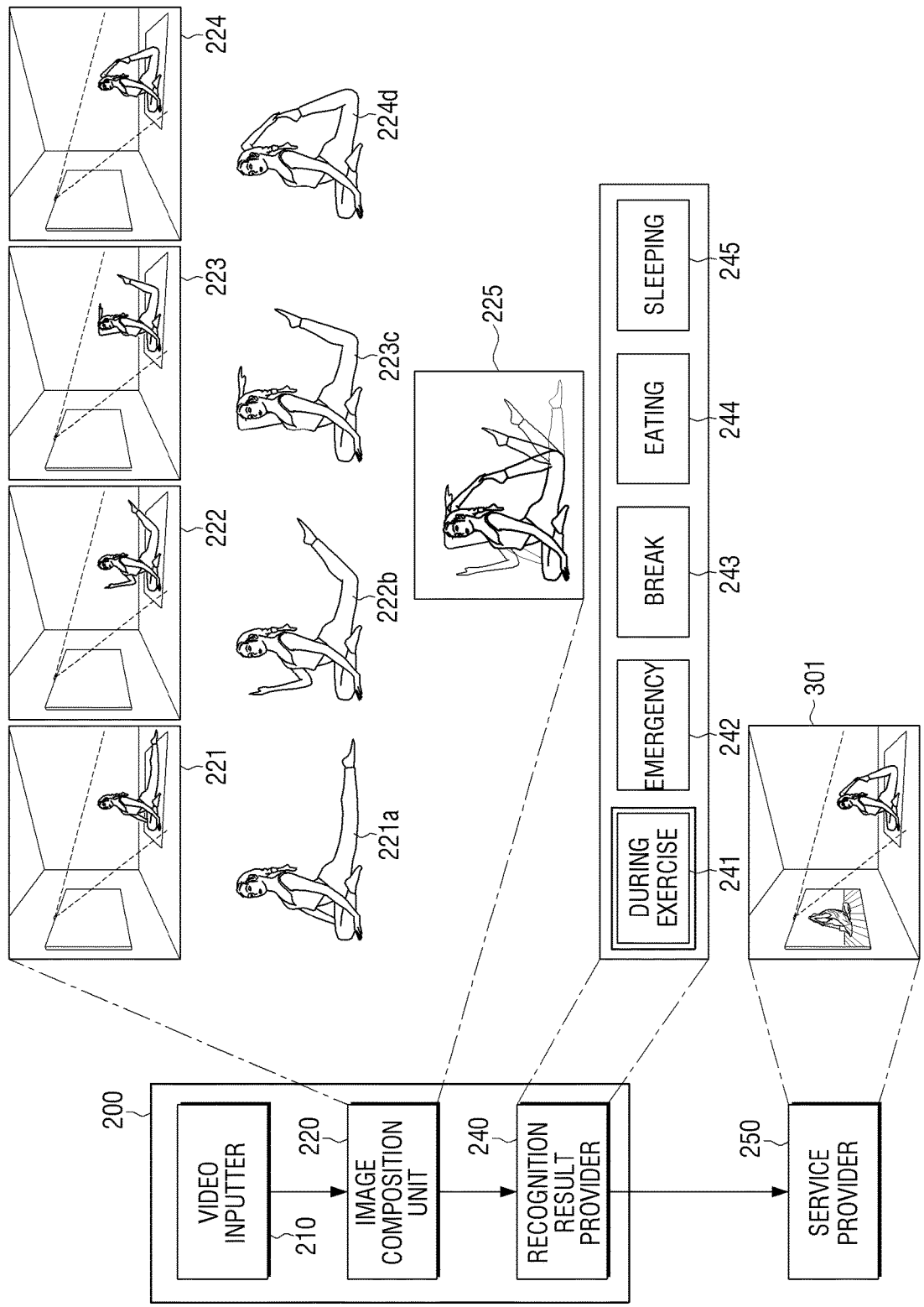
FIGS. 2A and 2B are block diagrams of data recognition apparatuses according to exemplary embodiments.

FIG. 2A is a block diagram of the data recognition apparatus 200 according to an exemplary embodiment. The data recognition apparatus 200 may perform state identification (for example, video analysis, etc.) based on data. The data recognition apparatus 200, using the learnt data recognition model, may recognize states from predetermined data. The data recognition apparatus 200 may obtain predetermined data based on preset criteria by learning, use the data recognition model with the obtained data as an input value, and determine a predetermined state based on the predetermined data. In addition, the result value which is output by the data recognition model with the obtained data as an input value may be used for updating the data recognition model.

Types of data which the data recognition apparatus 200 can recognize may include voice data, video data, text data, bio signal data, and so on, but they are not limited thereto and include all the data which can be classified by using another recognition model.

In the meantime, the present disclosure explains video data (or video) as a main example.

Referring to FIG. 2A, the data recognition apparatus 200 may include a video inputter 210, an image composition unit 220, and a recognition result provider 240.

The video inputter 210 may receive a video. The video may be formed by a plurality of images (or frames).

For example, the video inputter 210 may receive, from a user, a video to be recognized.

For example, a user may select, from videos prestored in an electronic apparatus the user owns, a video to be recognized and control so that the selected video is provided to the video inputter 210. Or, the user may execute a camera application of an electronic apparatus so that a video which is photographed through a camera of the electronic apparatus is provided to the video inputter 210.

Or, the video inputter 210 may receive a video through a camera of an electronic apparatus where the data recognition apparatus 200 is mounted, or an external camera (for example, CCTV or black box, etc.) which is communicable with the electronic apparatus where the data recognition apparatus 200 is mounted.

The image composition unit 220, based on a common area included in each of a plurality of images forming at least a portion of a video, may overlay at least a portion of the plurality of images and generate one composition image.

The image composition unit 220 may extract a plurality of common areas 221*a*, 222*b*, 223*c*, and 224*d* from the first to fourth images 221, 222, 223, and 224. Next, the image composition unit 220 may overlay the extracted plurality of common areas 221*a*-224*d* and generate a composition image 225.

A process of generating the composition image 225 from a video by the image composition unit 220 corresponds to a process that the image composition unit 120 generates a composition image from a video as illustrated in FIG. 1A and thus will not be described.

The recognition result provider 240 of FIG. 2A may receive a composition image which is generated from the image composition unit 220 as recognition data.

In addition, the recognition result provider 240 may further receive, for example, audio data, video data, text data, or bio signal data.

The recognition result provider 240 may apply the composition image to the learnt data recognition model and provide a recognition result of the video.

The recognition result provider 240 may provide a recognition result according to a purpose of recognition of data to a user. The recognition result of the video may be provided as a text, voice, video, image, or command (for example, application execution command, module function execution command, etc.).

For example, the recognition result provider 240 may provide a recognition result of an object included in the video (for example, people). The recognition result may include, for example, state information of an object included in the video and surrounding state information of an object, etc.

The recognition result provider 240 may provide state information of a person included in the video such as 'during exercise 241' 'emergency 242', 'break 243', 'eating 244', 'sleeping 245' as state information of an object by text, voice, video, image, or a command.

The recognition result provider 240 may determine a recognition result by additionally using a sensing value which is obtained from a sensor of an electronic apparatus in which the data recognition apparatus 200 is mounted.

Specifically, the recognition result provider 240 may determine location information of the data recognition apparatus 200 using a sensing value (for example, GPS information, network connection information, etc.) obtained from a sensor capable of acquiring position information. Then, the recognition result provider 240 can determine the recognition result in consideration of the position information.

For example, when the position of the data recognition apparatus 200 is a fitness center or a playground, the recognition result provider 240 can highly determine the possibility that the recognition result is "during exercise". In addition, the recognition result provider 240 may detect object information included in e based on the sensing value obtained from the sensor and determine the e result. For example, the recognition result provider 240 may additionally use a reading result of a QR code or a bar code included in the video and determine the recognition result.

The service provider 250 may provide a service based on a recognition result of the video.

The service provider 250 may be embodied as a software module or manufactured as a chip and mounted on various electronic apparatuses.

An electronic apparatus where the service provider 250 is mounted may be an apparatus which is identical with an apparatus where the data recognition apparatus 200 is mounted or a separate apparatus. When mounted on separate electronic apparatuses, an electronic apparatus where the service provider 250 is mounted and an electronic apparatus where the data recognition apparatus 200 is mounted can be connected by wired or wireless network. In this case, a recognition result of a video which is output from the data recognition apparatus 200 may be received by the electronic apparatus where the service provider 250 is mounted and a service based on the recognition result of the video can be provided.

The service provider 250 may include at least one application or a part of an operating system to provide a service based on the recognition result. Alternatively, the service provider 250 may execute the application of the electronic apparatus associated with the recognition result.

For example, if the video recognition result is 'during exercise' 241, the service provider 250 may provide a service 301 for coaching exercise. The service provider 250, for example, may control a display apparatus to display a video for coaching exercise in the display apparatus located in a front side of a user.

As another example, if the video recognition result is 'emergency 242', the service provider 250 may provide a service generating an emergency alarm. For example, the service provider 250 may send alarm information indicating emergency to an emergency disaster system or a health management system, etc.

Figure 2B:
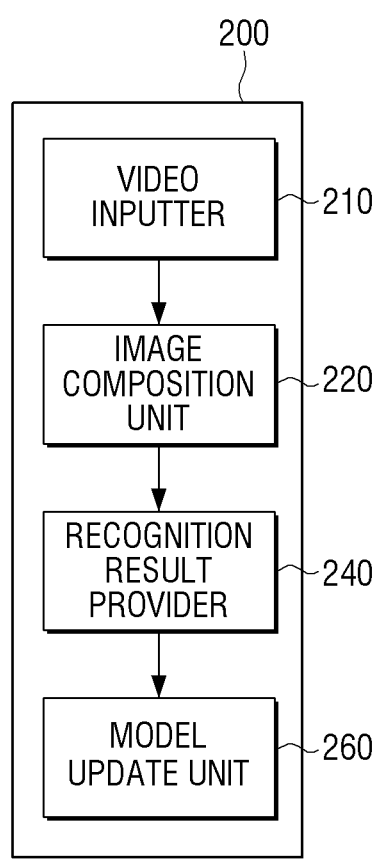

FIG. 2B is a block diagram of the data recognition apparatus 200 according to another exemplary embodiment.

Referring to FIG. 2B, the data recognition apparatus 200 may include the video inputter 210, the image composition unit 220, the recognition result provider 240, and a model update unit 260. In FIG. 2B, the video inputter 210, the image composition unit 220 and the recognition result provider 240 have been described in greater detail with reference to FIG. 2A and thus will not be further described.

The model update unit 260 may determine whether to use the data recognition model as it is or update of the data recognition model is required when data to be recognized is input, and may update the data recognition model according to a determination result.

For example, the model update unit 260 may determine whether to update or not by analyzing relevance between basic learning data used for learning of the pre-constructed data recognition model and the new input video or the composition image. At this time, relevance may be determined based on an area where the video or the composition image is generated, time when the video or the composition image is generated, size of the video or the composition image, genre of the video or the composition image, a generator of the video or the composition image, an object within the video or the composition image, an area where the video or the composition image is input, time when the video or the composition image is input, a type of an electronic apparatus which provides the video or the composition image, an application which provides the video or the composition image, or a type of an operating system. The model update unit 260 may identify that update is necessary in a case where relevance between basic learning data and data to be recognized is very low as described in an example.

For example, under the circumstance where the data recognition model is constructed with a video generated in Korea as basic learning data, if an input video is a video which is generated abroad, the model update unit 260 may identify that relevance between the video and the basic learning data is low and update of the data recognition model is necessary.

As another example, the model update unit 260 identifies a place where a video is input using global navigation satellite system (GNSS), cell-ID, and wireless LAN access position detection or the like, and if the basic learning data does not reflect a state which does not suit for the place where the video is input, it can be identified that relevance is low and update of a recognition model is necessary. These examples are for helping further understanding and are not limited thereto.

As still another example, the model update unit 260 may identify whether update is necessary based on recognition accuracy of the data recognition model which is currently loaded. At this time, the model update unit 260 may identify recognition correction level based on a result recognized by using the recognition model using a predetermined period, and if the determined recognition correction level does not satisfy the predetermined criteria (for example, average 80%), it can be identified that update of the data recognition model is necessary. In this case, the predetermined criteria may be preset based on an area where the data recognition model is mainly used.

As still another example, the model update unit 260 may identify whether to update the current data recognition model based on a response of a user regarding the recognition result of the recognition result provider 240. For example, when the recognition result provider 240 outputs a recognition result using the data recognition model, the model update unit 260 may present to the user a question inquiring whether the recognition result is correct, and identify whether to update or not based on the user's response regarding the inquiry.

If update of the current data recognition model is necessary as a result of identification, the model update unit 260 may update the data recognition model using various preset methods.

For example, the model update unit 260 may directly update the data recognition model by using learning data which is input to the data recognition model during a predetermined period as additional learning data. In this case, the model update unit 260 may request additional learning data to the data recognition model construction apparatus 100 or a user.

Alternatively, when the data recognition apparatus 200 is connected to the data recognition model construction apparatus 100 by wire or wirelessly, the model update unit 260 may transfer to the data recognition model construction apparatus 100 information regarding recognition accuracy of the data recognition model or learning data which has been input to the data recognition model for a predetermined period of time, receive a new data recognition model from the data recognition model construction apparatus 100, and update a data recognition model which is being used.

According to various exemplary embodiments, the data recognition apparatus 200 may include the video inputter 210 for receiving a video, the image composition unit 220 for generating a composition image by overlaying a plurality of images forming at least a portion of the video based on a common area included in each of the plurality of images, and the recognition result provider 240 which applies the composition image to the data recognition model and provides a recognition result of the video.

According to various exemplary embodiments, the image composition unit 220 may extract a common area from each of the plurality of images, overlay the extracted plurality of common areas, and generate a composition image.

According to various exemplary embodiments, the image composition unit 220 may generate a composition image based on the center of gravity of a common area.

According to various exemplary embodiments, the image composition unit 220 may generate a composition image by overlaying a common area and a background area around the common area from each of the plurality of images.

According to various exemplary embodiments, the image composition unit 220 may compensate a motion of a camera which photographs a video from each of a plurality of images, and generate a composition image based on a common area included in each of a plurality of images where a motion of the camera is compensated.

According to various exemplary embodiments, the data recognition apparatus 200 may further include the model update unit 260 which identifies whether to update the data recognition model, and updates the data recognition model according to the identification result.

According to various exemplary embodiments, the electronic apparatus may include the data recognition apparatus 200 and the service provider 250 which provides a service based on a recognition result of a video provided by the data recognition apparatus 200.

Figure 3:
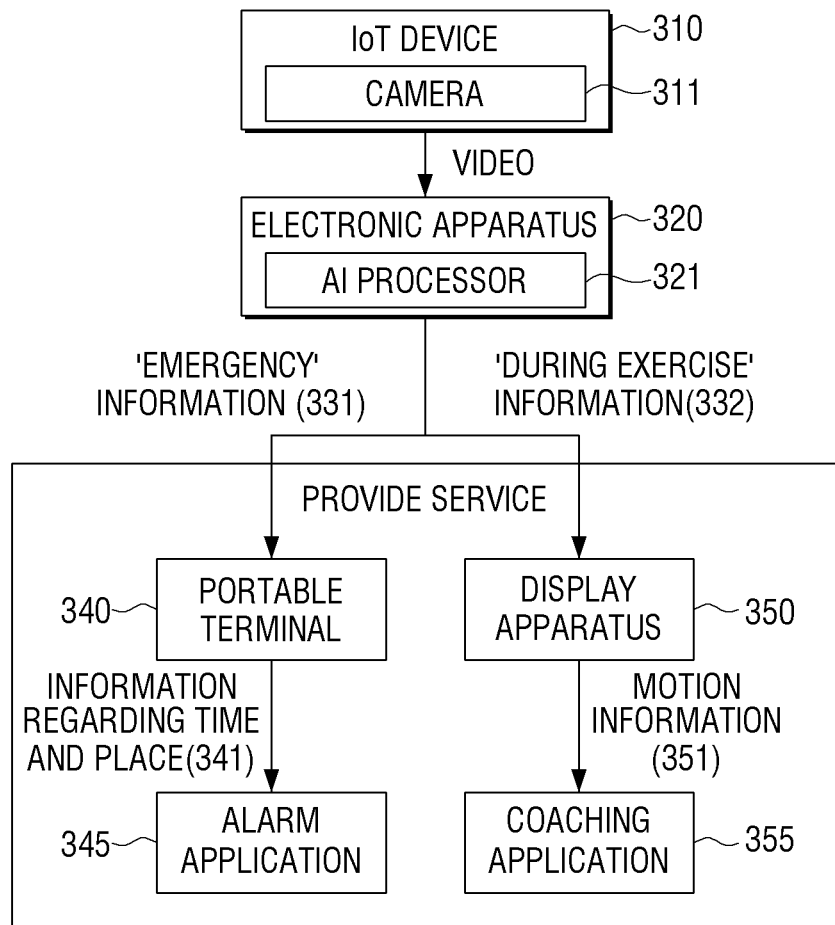
FIG. 3 is a view illustrating a process of providing a service based on a recognition result of a video according to an exemplary embodiment.

FIG. 3 is a view illustrating a process of providing a service based on a recognition result of a video according to an exemplary embodiment.

In FIG. 3, the data recognition apparatus 200 may be embodied as a software module or a hardware chip (e.g., AI processor) 321 and mounted on an electronic apparatus 320. Here, the electronic apparatus 320 where the data recognition apparatus 200 is mounted can be aforementioned various electronic apparatuses.

In this situation, an external apparatus (for example, internet of things (IoT) device) 310 may photograph surrounding environment of the external apparatus using a camera 311, and send the photographed video to the electronic apparatus 320. The electronic apparatus 320 may recognize a video received by using the data recognition apparatus 200 and transfer the video recognition result to the service provider 250. In this case, the electronic apparatus 320 may further transfer, to the service provider 250, not only a video recognition result but also a photographed video or a composition image generated from the video.

The service provider 250 may be provided on the electronic apparatus where the data recognition apparatus 200 is mounted or on separate electronic apparatuses 340, 350.

The service provider 250 may provide a service based on a recognition result of a provided video. Or, the service provider 250 may provide a service corresponding to a recognition result using a received video and a composition image.

For example, when the recognition result of a video is state information 331 indicating that a person included in a video is in a "emergency state", the service provider 250 may provide a service based on the 'emergency state'. For example, the service provider 250 may obtain, from a portable terminal 340 a user owns, information 341 regarding current time and place. Alternatively, the service provider 250 may receive, from the received video and the composition image, information regarding time and place.

Next, the service provider 250 can use the alarm application 345 to control the alarm application 345 to notify the 'emergency' based on the acquired time and place information 341.

In this case, the alarm application 345 may be an application installed in the electronic apparatus 320 where the data recognition apparatus 200 is loaded, or an application installed in the portable terminal 340 providing time and place information 341. Alternatively, the alarm application 345 may be an application installed in an external emergency disaster system or a health management system.

As another example, if a recognition result of a video is state information 332 indicating that a person included in the video is 'during exercise', the service provider 250 may provide a service based on 'during exercise'. For example, the service provider 250 may obtain motion information 351 from a display apparatus 350 positioned around the person. Or, the service provider 250 may obtain the motion information 351 from the received video and the composition image.

Next, the service provider 250 may control that the coaching application 355 provides a coaching service according to a motion of the person 'during exercise' by providing the obtained motion information 351 to the coaching application 355.

In this case, the coaching application 355 may be an application which is installed in the electronic apparatus 320 where the service provider 250 is loaded, or an application which is installed in the display apparatus 350 which provides motion information 351. Or, the coaching application 355 may be an application which is installed in a separate electronic apparatus located around the person.

According to various exemplary embodiments, when the service provider 250 is provided in an electronic apparatus (for example, smartphone), the electronic apparatus may provide a service to automatically classify videos provided by a gallery application provided by the electronic apparatus using the data recognition model of the present disclosure.

For example, the electronic apparatus may provide videos included in a gallery application to the data recognition apparatus 200. The data recognition apparatus 200 may be mounted in the electronic apparatus, or mounted in an external apparatus (for example, server) of the electronic apparatus. The data recognition apparatus 200 may generate a composition image for each of the input videos, apply it to the data recognition model to obtain recognition results of a plurality of videos, and provide them to the service provider 250. The video recognition result may be various attributes, for example, genre of a video, a viewer of a video, contents of a video, character of a video, state information of an object included in a video, and is not limited thereto.

The electronic apparatus may automatically classify videos included in a gallery application using a recognition result of a provided video. According to the video recognition result, the electronic apparatus may perform automatic classification such as locating videos having the same or similar attributes in the same folder or moving an icon or a thumbnail corresponding to the videos to a specific area of a screen.

In the meantime, a recognition result of classifying a video can be inserted as meta data of each video.

According to various exemplary embodiments, when the service provider 250 is provided on an electronic apparatus (e.g., camera), the electronic apparatus may provide a service to automatically set a photographing mode to photograph a preview image obtained by the electronic apparatus using the data recognition model.

For example, the electronic apparatus may provide preview videos obtained through a lens to the data recognition apparatus 200 of the present disclosure. The data recognition apparatus 200 may be mounted on an electronic apparatus, or on another apparatus. The data recognition apparatus 200 may generate a composition image for the input preview video, obtain a video recognition result by applying the composition image to the data recognition model, and provide it to the service provider 250. For example, the service provider 250 may provide a photographing mode suitable for photographing of a preview video in consideration of a place where a preview video is generated or surrounding environment condition, based on a video recognition result.

The electronic apparatus may automatically set a photographing mode to photograph a preview video using the provided video recognition result.

According to various exemplary embodiments, when the service provider 250 is provided on an electronic apparatus (e.g., disaster system), the electronic apparatus, if a video photographed by an external apparatus (e.g., CCTV) is recognized using the data recognition model in order to monitor emergency, may provide a contingency alarm service based on the recognition result.

For example, the external apparatus may provide a video of a surrounding circumstance to the data recognition apparatus 200. The data recognition apparatus 200, for a video of a surrounding circumstance, may generate a composition image, apply it to the data recognition model and obtain a video recognition result, and provide the video recognition result to the service provider 250. The video recognition result may be, for example, status information of a person included in a video.

When a current status of a person is emergency in which an accident occurs, the electronic apparatus can provide a notification service notifying family of the person or a hospital located nearby of such emergency using the provided video recognition result.

According to various exemplary embodiments, when the service provider 250 is provided on an electronic apparatus (e.g., home gateway or home robot), if a video photographed by an IoT device provided with a camera is recognized by using the data recognition model in order to monitor daily behavior of a person at home, the electronic apparatus may provide a connected service for the daily behavior based on a recognition result.

For example, in a situation where a person at home cooks, an external IoT device may provide a video photographing the person to the data recognition apparatus 200. The data recognition apparatus 200 may generate a composition image with respect to a video regarding the surrounding status, apply it to the data recognition model to obtain a video recognition result, and provide the video recognition result to the service provider 250. The video recognition result may be, for example, status information that the person cooks.

The electronic apparatus may provide a connected service to assist cooking by using the provided video recognition result. For example, the electronic apparatus may control lighting of a kitchen where a cooking person is located or provide a recipe through a display located nearby.

According to various exemplary embodiments, when the service provider 250 is provided on an electronic apparatus (e.g., ECM (Engine Control Module)) provided in an automobile and a video photographed by a front camera provided on the automobile is recognized using the data recognition model, the electronic apparatus may provide a service for controlling a brake pedal or accelerator pedal based on the recognition result.

For example, in a situation where a running or walking passenger appears in front of an automobile, a camera of the automobile may provide a video photographing a front side to the data recognition apparatus 200. The data recognition apparatus 200 may generate a composition image with respect to the video photographing the front side, apply it to the data recognition model to obtain a video recognition result, and provide the video recognition result to the service provider 250. The video recognition result may be, for example, status information indicating walking status of the passenger.

The electronic apparatus may control driving of an automobile using the provided video recognition result. For example, when waking status indicates that a passenger runs, the electronic apparatus may control a reaction speed of a brake pedal to be sensitive, or a reaction speed of an accelerator pedal to be insensitive. In contrast, when waking status indicates that a passenger walks, the electronic apparatus may control a reaction speed of a brake pedal to be insensitive, or a reaction speed of an accelerator pedal to be sensitive.

According to various exemplary embodiments, when the service provider 250 is provided on an electronic apparatus (e.g., ECM (Engine Control Module)) of an automobile, and a video photographed by an interior-looking camera which photographs a rider in an automobile is recognized by using the data recognition model of the present disclosure, the electronic apparatus may change an operation mode of the automobile to a safe driving mode or provide an alarm service based on the recognition result. The safety driving mode, for example, may be a mode to reduce speed of the automobile, control the automobile to automatically drive, or compulsorily park the automobile.

For example, the interior-looking camera may provide a video photographing a driver or a fellow rider to the data recognition apparatus 200. The data recognition apparatus 200 may generate a composition image with respect to a video photographing the interior of the automobile, apply it to the data recognition model to obtain a video recognition result, and provide the video recognition result to the service provider 250. The video recognition result may be statue information indicating, for example, a driving status of a driver or fellow riding status of a fellow rider.

The electronic apparatus may change a driving mode of an automobile to a safety driving mode or provide an alarm service using the provided video recognition result. For example, when the video recognition result indicates that a driver's driving status is drowsy driving, the electronic apparatus may change a driving mode of an automobile to a safety driving mode, or provide an auditory or visual UI as an alarm service inducing rest.

As still another example, if a video recognition result indicates that an emergency accident (e.g., violence, robbery, etc.) is occurring, an electronic apparatus may change a driving mode of an automobile to a safety driving mode or send a message indicating such emergency accident to a system of an emergency response center (e.g., police station, fire station, etc.) nearby.

Figure 4:
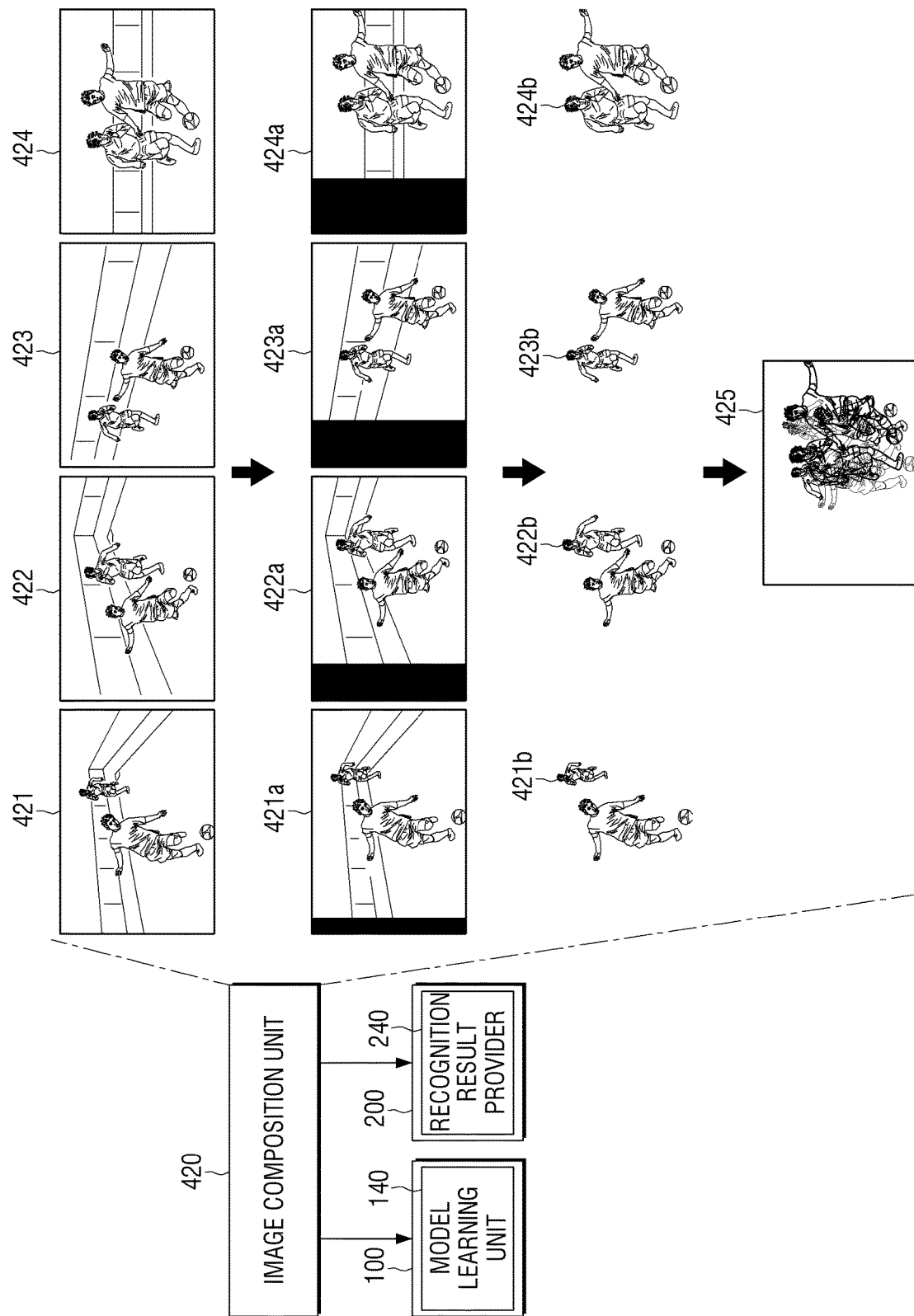
FIGS. 4 to 6 are views illustrating a processing of an image composition unit according to an exemplary embodiment.
Figure 5:
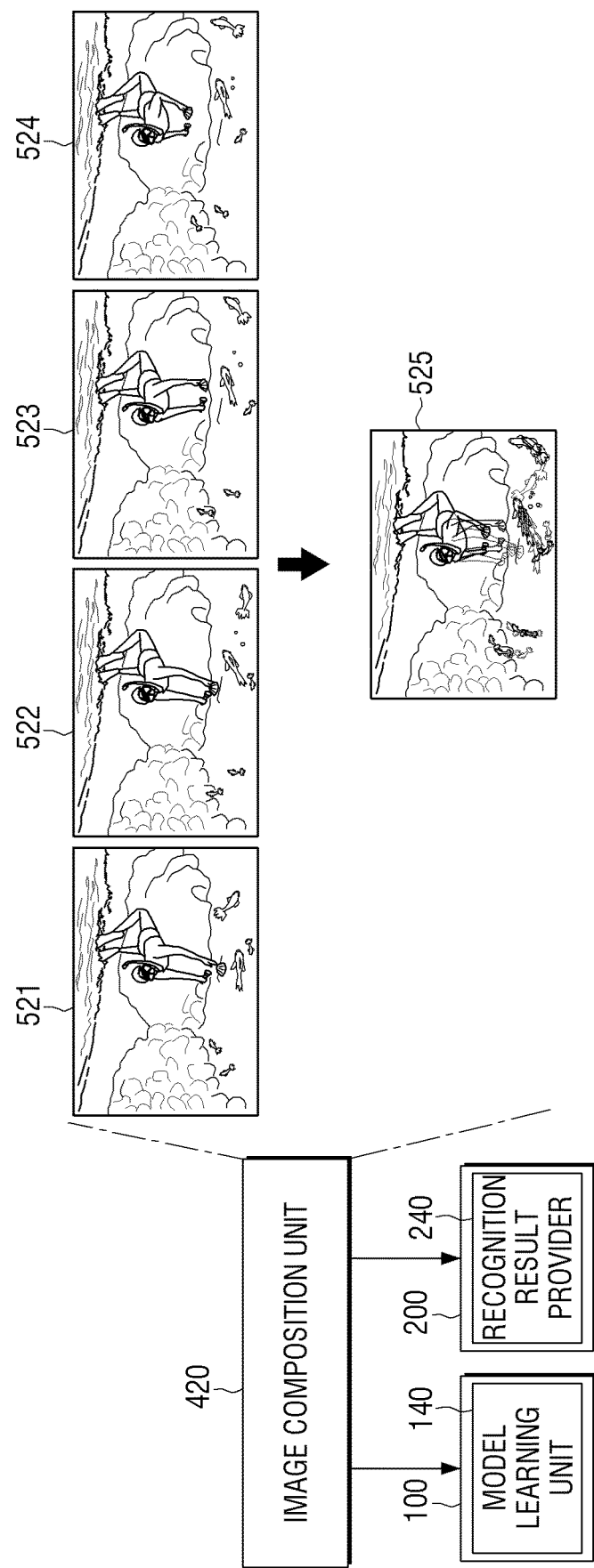
Figure 6:
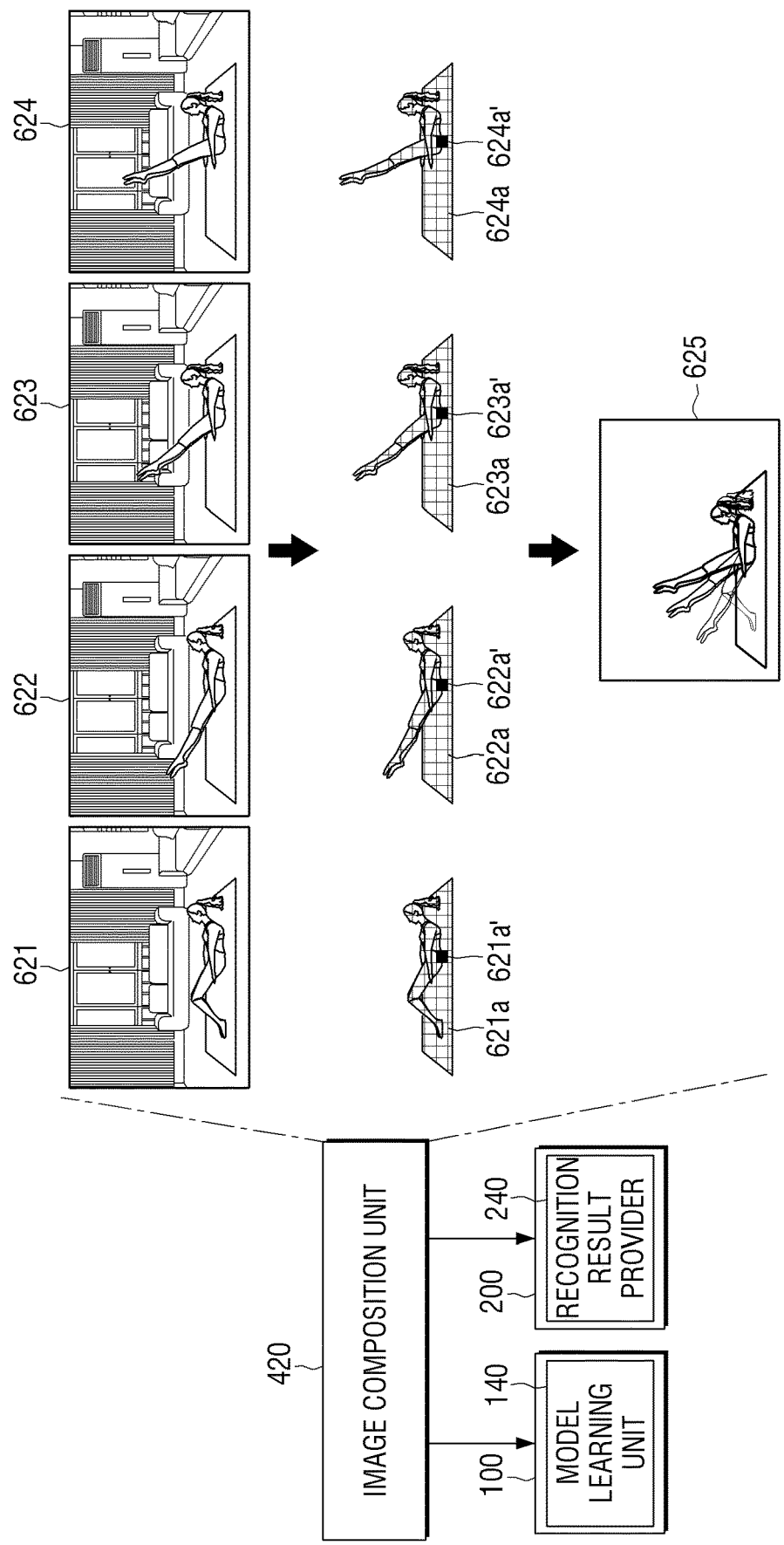

FIGS. 4 to 6 are views illustrating a process of an image composition unit according to an exemplary embodiment.

The image composition unit 420 of FIGS. 4 to 6 may be the image composition unit 120 of the data recognition model construction apparatus 100 of FIGS. 1A and 1B, or the image composition unit 220 of the data recognition apparatus 200 of FIGS. 2A and 2B.

When the image composition unit 420 is the image composition unit 110 of FIGS. 1A and 1B, the image composition unit 420 may receive a video, generate one or more composition images, and transfer the images to the model learning unit 140 of the data recognition model construction apparatus 100. Alternatively, when the image composition unit 420 is the image composition unit 220 of FIGS. 2A and 2B, the image composition unit 420 may receive a video, generate one or more composition images, and transfer the images to the recognition result provider 240 of the data recognition apparatus 200.

In FIG. 4, the image composition unit 420 may compensate a motion of a camera which photographs a video.

The image composition unit 420 may selectively compensate a motion of the camera according to photographing attributes of the camera which photographs an input video.

For example, when a video is photographed by a camera which is fixed at a point, the image composition unit 420 may omit a motion of the camera.

In this case, a situation where a video is photographed by a fixed camera may be, for example, a situation of photographing an entire area where a movement of a person is generated (e.g., photographing a cooking person or a dancing person on a stage, etc.), or a situation of photographing a moving person without moving a place (e.g., photographing a person enjoying sports such as golf or a person exercising static sports such as push-up, etc.).

In contrast, when a video is photographed by a moving camera, the image composition unit 420 may compensate a motion of the camera.

In this case, a situation where a video is photographed by a moving camera may be, for example, a situation where a camera follows a moving line of a person (e.g., a situation of photographing a person playing soccer, etc.), or a situation where a camera is shaking due to surrounding factors (e.g., shaking of a camera by wind or shaking due to natural disaster, etc.).

To be specific, in FIG. 4, a plurality of images forming at least a portion of a video can be first to fourth images 421, 422, 423, and 424 photographed by a moving camera.

The image composition unit 420 may extract a motion path of pixels composing an image using, for example, optical flow estimation, and estimate a motion path of a camera based on a motion path of extracted pixels for compensation of a motion of the camera.

By applying a motion in an opposite direction of the estimated motion path of the camera to an image, the image composition unit 420 may generate first to fourth images 421a, 422a, 423a, and 424a from the first to fourth images 421-424. In this case, backgrounds of the first to fourth images 421a-424a can be fixed and only a person included in an image can move.

The image composition unit 110 may extract common areas 421b, 422b, 423b, and 424b from the first to fourth images 421a-424a where a motion of the camera is compensated.

When the plurality of common areas 421b-424b are extracted, the image composition unit 420 may overlay the plurality of extracted common areas and generate a composition image 425.

The image composition unit 420 may transfer the generated composition image 425 to the model learning unit 140 of the data recognition model construction apparatus 100, or the recognition result provider 240 of the data recognition apparatus 200.

In FIG. 5, the image composition unit 420 may overlay a common area and a background area around the common area included in a video and generate a composition image.

In this case, the image composition unit 420, according to a background attribute included in an input video, may selectively overlay a common area and a background area and generate a composition image.

For example, when a background included in the video has significant relevance (e.g., a situation of photographing a person playing ski or snorkeling) with a common area (or a common object) included in the video, the image composition unit 420 may overlay a common area and a background area included in the video and generate a composition image.

Alternatively, in a situation where a ratio of an area corresponding to a background in a video is low (e.g., a situation of photographing a table tennis play with a full shot angle where a weight of a person is high), the image composition unit 420 may overlay a common area and a background area around the common area included in a video and generate a composition image.

In contrast, when a background included in a video has low relevance with a common area included in a video (e.g., a situation of photographing shaking of another person, running or walking), the image composition unit 420 may omit composition of a background area, overlay a common area only, and generate a composition image.

Alternatively, in a situation where a ratio of an area corresponding to a background of a video is high (e.g., a situation of photographing a soccer game where many people collaborate with each other with a full-shot angle), the image composition unit 420 may omit composition of a background area, only compose a common area, and generate a composition image.

To be specific, in FIG. 5, a plurality of images forming a portion of a video may be the first to fourth images 521, 522, 523, and 524 where relevance between a common area and a background area is significant.

In this case, the image composition unit 420 may overlay a common area and a background area and generate a composition image 525.

The image composition unit 420 may transfer the generated composition image 525 to the model learning unit 140 of the data recognition model construction apparatus 100, or the recognition result provider 240 of the data recognition apparatus 200.

In FIG. 6, the image composition unit 420 may generate a composition image with reference to the center of gravity of a plurality of common areas.

In this case, the image composition unit 420 may selectively generate a composition image with respect to the center of gravity according to attributes of a plurality of common areas (or common objects).

For example, in a situation where a movement of the center of gravity of a common area of each of a plurality of images is less (e.g., a situation of photographing a person enjoying golf or yoga with less movements), the image composition unit 420 may synchronize a plurality of images with respect to the center of gravity of common areas and generate a composition image.

Or, when a composition image is generated by synchronizing the center of gravity of a common area of each of a plurality of images, in a situation (e.g., a situation of photographing a person doing yoga) where changes in movements are expected with respect to the center of gravity among the common areas, the image composition unit 420 may generate a composition image by synchronizing a plurality of images with respect to the center of gravity of common areas.

In contrast, in a situation where movement of the center of gravity of a common area of each of a plurality of images is significant (e.g., a situation of photographing a person enjoying basketball or skating with large motion), the image composition unit 420 may omit synchronizing process and generate a composition image. That is, in a situation where information regarding movement trace according to movement of common areas is important, the image composition unit 420 may omit synchronization process and generate a composition image which includes information regarding movement trace.

To be specific, in FIG. 6, a plurality of images forming a portion of a video may be first to fourth images 621, 622, 623, and 624 having less movement of the center of gravity.

The image composition unit 420 may extract common areas (or common objects) 621a, 622a, 623a, 624a from the first to fourth images 621-624 by using human segmentation technique or moving object detection technique for synchronizing a plurality of images.

In addition, the image composition unit 420 may calculate an average of coordinate values of the plurality of extracted common areas 621a-624a, and generate the composition image 625 by overlaying a plurality of common areas so that each of the center of gravity 621a', 622a', 623a', 624a' of common areas 621a-624a is matched.

The image composition unit 420 may transfer the generated composition image 625 to the model learning unit 140 of the data recognition model construction apparatus 100 or the recognition result provider 240 of the data recognition apparatus 200.

Figure 7:
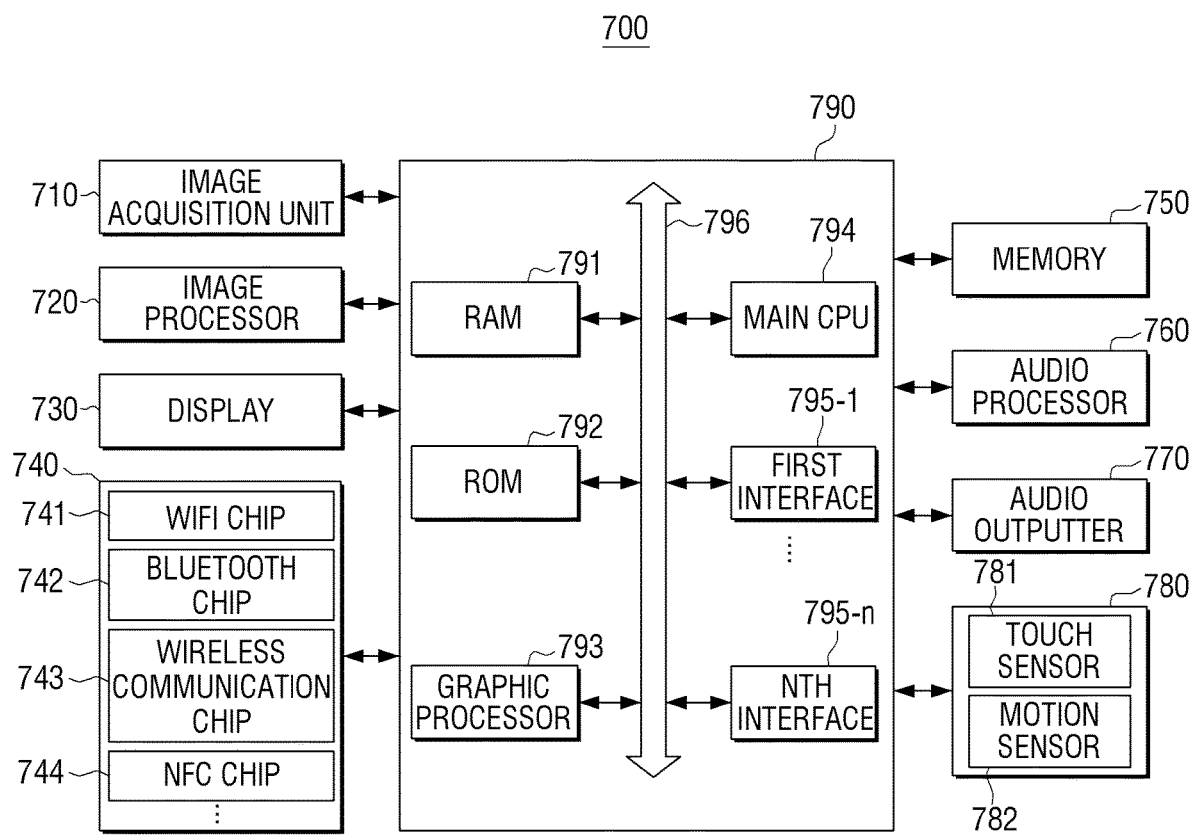
FIG. 7 is a block diagram illustrating a configuration of an electronic apparatus according to an exemplary embodiment.

FIG. 7 is a block diagram illustrating a configuration of the electronic apparatus according to various exemplary embodiments.

The electronic apparatus 700 of FIG. 7 may be an electronic apparatus where the data recognition model construction apparatus 100 is mounted, an electronic apparatus where the data recognition apparatus 200 is mounted, or an electronic apparatus where the service provider 250 is mounted. In addition, the electronic apparatus 700 may be an electronic apparatus where two or more of the data recognition model construction apparatus 100, the data recognition apparatus 200, and the service provider 250 are mounted. A processor 790 of the electronic apparatus 700 may include at least one from among the data recognition model construction apparatus 100, the data recognition apparatus 200, and the service provider 250.

As illustrated in FIG. 7, the electronic apparatus 700 may include at least one of an image acquisition unit 710, an image processer 720, a display 730, a communicator 740, a memory 750, and audio processor 760, an audio outputter 770, a sensor 780, and a processor 790. In the meantime, the configuration of the electronic apparatus 700 illustrated in FIG. 7 is merely exemplary and is not essentially limited to the block diagram. Therefore, according to a type or purpose of the electronic apparatus 700, a part of the features of the electronic apparatus 700 as illustrated in FIG. 7 may be omitted, deformed, or added.

The image acquisition unit 710 may acquire video data through various sources. For example, the image acquisition unit 710 may receive video data from an external server and receive video data from an external apparatus. In addition, the image acquisition unit 710 may acquire video data by photographing an external environment. For example, the image acquisition unit 710 may be embodied as a camera which photographs an external environment of the electronic apparatus 700. The video data obtained through the image acquisition unit 710 may be processed by the video processor 720.

The video processor 720 may perform processing of video data received from the image acquisition unit 710. The video processor 720 may perform various image processing such as decoding, scaling, noise filtering, frame rate conversion, and resolution conversion with respect to video data.

The video processor 720 may provide the processed video data to the video inputter 110 of the data recognition model construction apparatus 100 or the video inputter 120 of the data recognition apparatus 200.

The display 730 may display a video data processed from the video processor 720 on a display area. The display 730 may be coupled to at least one of a front area, a side area, and a back area of the electronic apparatus 700 in a form of a flexible display. The flexible display is bent, curved, or rolled without damages through a substrate that is thin and flexible as paper.

The display 730 may be embodied as a touch screen of a layer structure by being combined with a touch sensor 781. The touch screen may have not only a display function but also a function to sense a touch input position, a touched area, and a touch input, and further, a function to sense not only a real touch but also a proximity touch.

The display 730 may output visual data for providing a service by control of the service provider 250.

The communicator 740 may perform communication with various types of external devices according to communications in various types. The communicator 740 may include at least one of a WiFi chip 741, Bluetooth chip 742, wireless communication chip 743, and NFC chip 744. The processor 790 may communicate with an external server or various external devices using the communicator 740.

The memory 750 may store various programs and data required for the operations of the electronic apparatus 700. The memory 750 may be embodied as a non-volatile memory, a volatile memory, a flash memory, a hard disk drive (HDD), or a solid state drive (SSD). The memory 750 may be accessed by the processor 790, and reading/recording/correcting/deleting/renewing of data can be performed by the processor 790. In the present disclosure, the term memory may include the memory 750, a ROM (not shown) within the processor 790, a RAM (not shown), or a memory card (not shown) installed in the electronic apparatus 700 (for example, micro SD card, memory stick).

In addition, a program for constructing various screens to be displayed in a display area of the display 730 and data may be stored in the memory 750. The memory 750 may store the data recognition model.

The audio processor 760 is an element to perform processing of audio data. In the audio processor 760, various processing such as decoding, amplification, and noise filtering of audio data can be performed. The audio data processed by the audio processor 760 may be outputted to the audio outputter 770.

The audio outputter 770 is an element to output various audio data which is processed by decoding, amplification, noise filtering by the audio processor 760 and also alarm sounds and voice message. In particular, the audio outputter 770 may be embodied as a speaker but this is merely exemplary and can be embodied as an output terminal which can output audio data.

The audio outputter 770, by the control of the service provider 250, may output audio data for providing a service.

The sensor 780 senses various user interactions. The sensor 780 may sense at least one of changes such as posture, luminance, acceleration of the electronic apparatus 700, and transmit an electrical signal to the processor 790. That is, the sensor 780 may sense state changes based on the electronic apparatus 700, generate a corresponding sensing signal, and transfer it to the processor 790.

The sensor 780 may be formed as various sensors, and may include at least one of the sensing devices of all types which can detect state changes of the electronic apparatus 700. For example, the sensor 780 may include at least one of a touch sensor, an acceleration sensor, a Gyro sensor, an illuminance sensor, a proximity sensor, a pressure sensor, a noise sensor (e.g., microphone), a video sensor (e.g., a camera module), pen sensor, and a timer.

The sensor 780 may be classified as a touch sensor 781 and a motion sensor 782, etc. according to the purpose of sensing, but it is not limited thereto and can be classified according to various purposes. This does not indicate physical classification, and the roles of the sensors 781 and 782 can be performed by combining at least two sensors. In addition, according to an embodiment method, a part of a configuration or a function of the sensor 780 can be included in the processor 790.

The touch sensor 781 may sense finger input of a user and output a touch event value corresponding to a touched touch signal.

The motion sensor 782 may sense a movement (for example, rotation, tilting, etc.) of the electronic apparatus 700 using at least one of an acceleration sensor, a tilt sensor, a Gyro sensor, and a 3-axis magnetic sensor. In addition, the motion sensor 782 may transmit a generated electrical signal to the processor 790.

The sensor 780 may sense an operation state or a surrounding state of a user by control of the service provider 250. The service provider 250 may provide a service based on a video recognition result and sensed information according to the present disclosure.

The processor 790 (or, a controller) may control overall operations of the electronic apparatus 700 using various programs stored in the memory 750.

The sensor 780 may further include various sensors such as a GPS sensor which may sense position information of the electronic apparatus 700.

The processor 790 may include RAM 791, ROM 792, a graphic processor 793, main CPU 794, first to nth interface 795-1-795-n, bus 796 and so on. In this case, the RAM 791, the ROM 792, the graphic processor 793, the main CPU 794, first to nth interface 795-1-795-n can be interconnected through the bus 796.

In the meantime, the data recognition model construction apparatus 100 and the data recognition apparatus 200 may be mounted on one electronic apparatus, or may be mounted on a separate electronic apparatus. For example, one of the data recognition model construction apparatus 100 and the data recognition apparatus 200 may be included in the electronic apparatus, and the other one may be included in the server. The data recognition model construction apparatus 100 and the data recognition apparatus 200 may transmit the model information constructed by the data recognition model construction apparatus 100 to the data recognition apparatus 200 via a wired or wireless network, and data input to the data recognition apparatus 200 may be transmitted to the data recognition model construction apparatus 100 as additional learning data.

Figure 11:
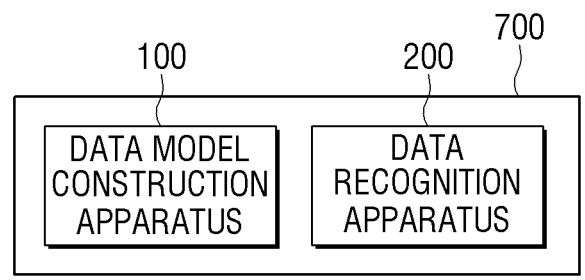
FIGS. 11 and 12 are views to describe various exemplary embodiments of a processor of an electronic apparatus according to various exemplary embodiments.

For example, as illustrated in FIG. 11, the electronic apparatus 700 may include the data recognition model construction apparatus 100 and the data recognition apparatus 200.

Figure 12:
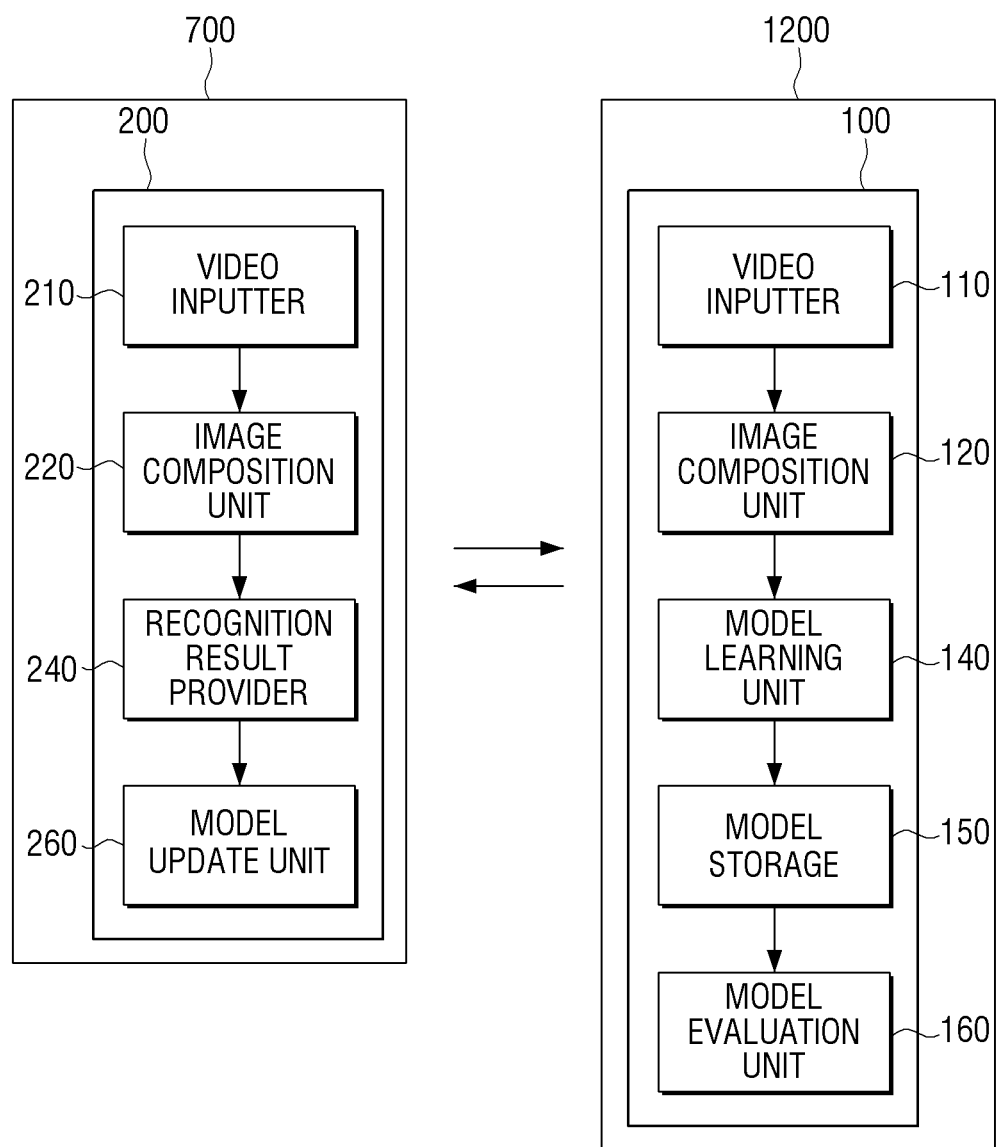

Alternatively, as illustrated in FIG. 12, the data recognition apparatus 200 may be included in the electronic apparatus 700, and the external server 1200 may include the data recognition model construction apparatus 100.

Referring to FIG. 12, the server 1200 may learn criteria for state determination, and the electronic apparatus 700 may determine a state based on a learning result by the server 1200.

In this case, the model learning unit 140 of the server 1200 may learn criteria for which data to be used to determine a predetermined state and how to determine a state by using data. The model learning unit 140 may learn criteria for determining a state by obtaining data to be used for learning and applying the obtained data to the data recognition model to be described later.

In addition, the recognition result provider 240 of the electronic apparatus 700 may apply a composition image received through the recognition result provider 240 to the data recognition model generated by the server 1200 and determine a state. For example, the recognition result provider 240 may transmit the inputted composite image to the server 1200, and request the server 1200 to apply the composite image to the data recognition model to determine the situation. In addition, the recognition result provider 240 may receive information on a state determined by the server 1200 from the server 1200. Or, the recognition result provider 240 of the electronic apparatus 700 may receive the data recognition model generated by the server 1200 from the server 1200, and determine a state by using the received data recognition model. In this case, the recognition result provider 240 of the electronic apparatus 700 can determine the situation by applying the input composite image to the data recognition model received from the server 1200.

However, the above is merely exemplary, and the electronic apparatus 700 may include the data recognition model construction apparatus 100, and an external apparatus may include the data recognition apparatus 200. In addition, the electronic apparatus 700 may include at least one of the video inputter 110, the image composition unit 120, the model learning unit 140, the model storage 150, the model evaluation unit 160, the video inputter 210, the image composition unit 220, the recognition result provider 240, and the model update unit 260.

Figure 8A:
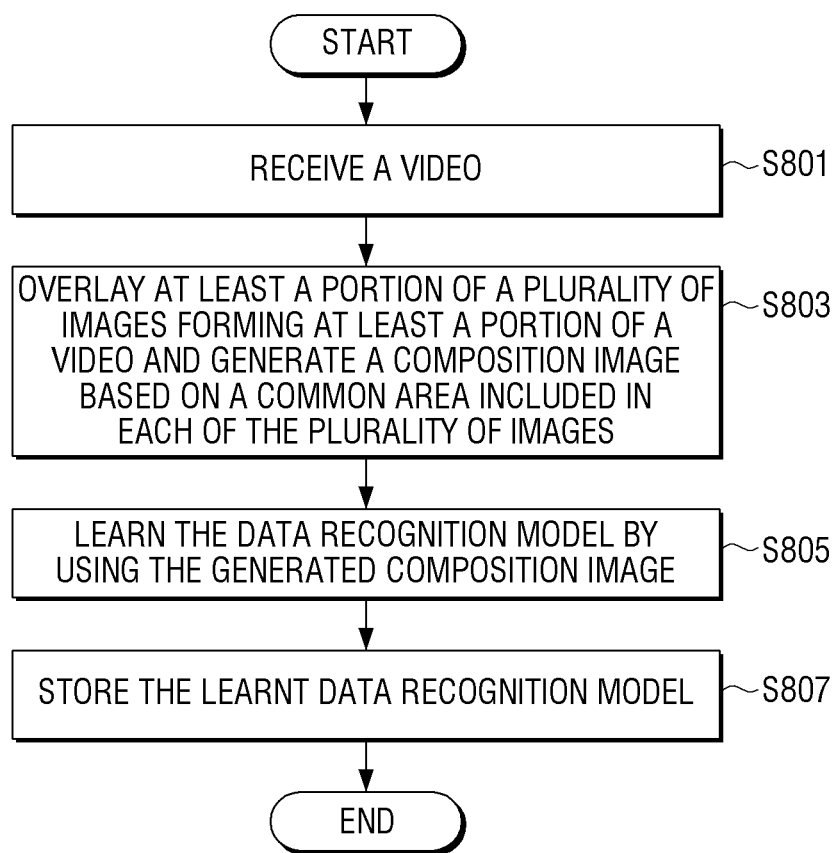
FIG. 8A is a flowchart indicating a method for constructing a data recognition model by a data recognition model construction apparatus according to an exemplary embodiment.

FIG. 8A is a flowchart illustrating a method for constructing a data recognition model by the data recognition model construction apparatus 100. At this time, the data recognition model construction apparatus 100 may be the electronic apparatus 700, but this is merely exemplary and may be implemented as the server 1200.

In FIG. 8A, the data recognition model construction apparatus 100 may receive a video (S801).

The data recognition model construction apparatus 100 may overlay at least a portion of a plurality of images forming at least a portion of a video and generate a composition image based on a common area included in each of the plurality of images (S803).

According to various exemplary embodiments, the data recognition model construction apparatus 100 may extract a plurality of common areas from a plurality of images, overlay the plurality of common areas extracted from images, and generate a composition image.

According to various exemplary embodiments, the data recognition model construction apparatus 100 may generate a composition image with reference to the center of the gravity of a common area.

According to various exemplary embodiments, the data recognition model construction apparatus 100 may overlap a common area with a background area around the common area included in a plurality of images and generate a composition image.

According to various exemplary embodiments, the data recognition model construction apparatus 100 may compensate movements of a camera which photographs a video from each of a plurality of images and generate a composition image based on common areas included in a plurality of images where movements of the camera are compensated.

Referring back to FIG. 8A, the data recognition model construction apparatus 100 may learn the data recognition model by using the generated composition image (S805).

The data recognition model construction apparatus 100 may store the learnt data recognition model (S807).

Figure 8B:
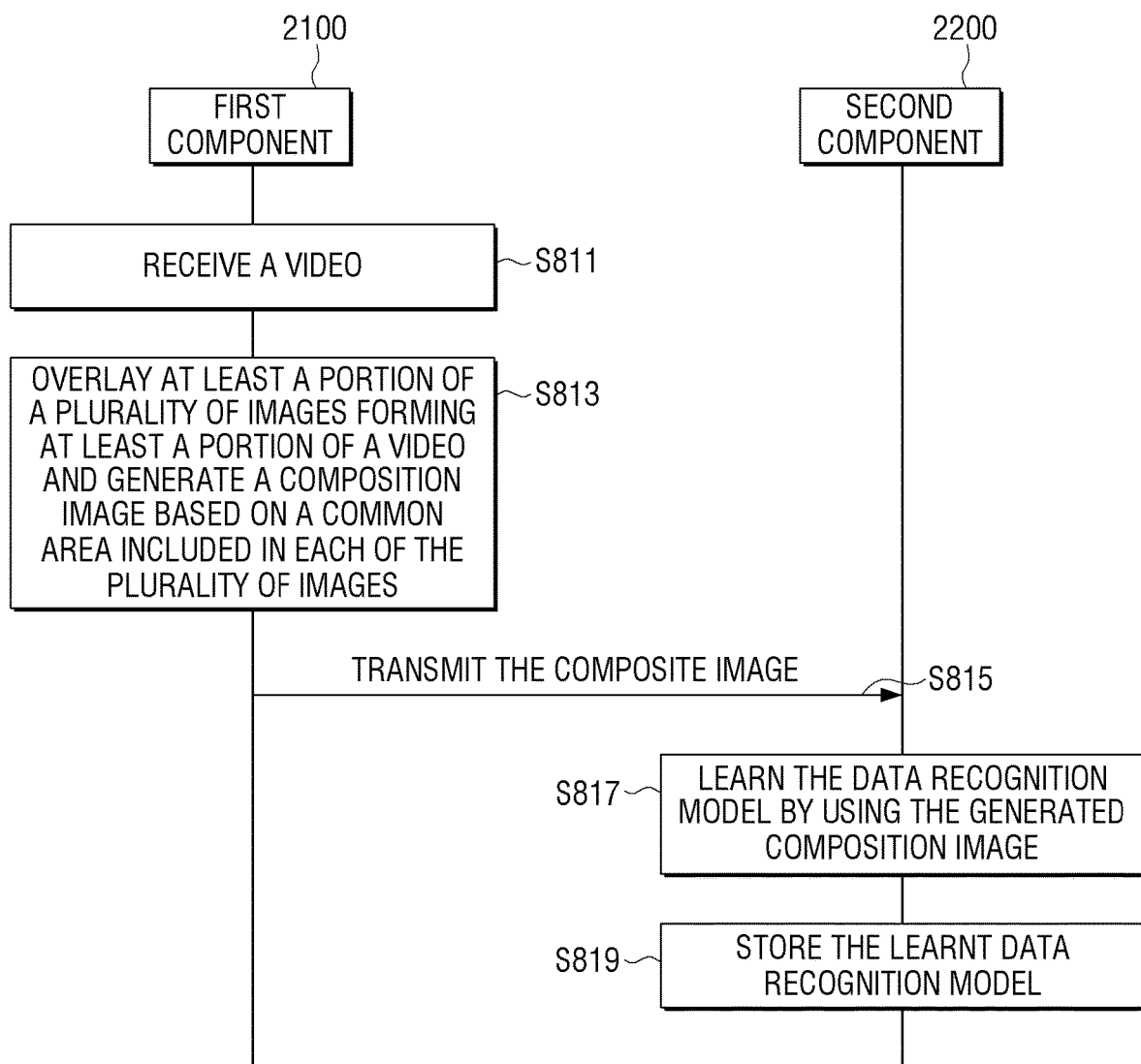
FIG. 8B is a sequence map illustrating a method for constructing a data recognition model by a system including an electronic apparatus and a server according to an exemplary embodiment.

FIG. 8B is a flowchart illustrating a method for constructing a data recognition model by a system for constructing a data recognition model according to an exemplary embodiment of FIG. 8B. At this time, a system for constructing a data recognition model may include a first component 2100 and a second component 2200.

In one example, the first component 2100 may be the electronic apparatus 700 and the second component 2200 may be the server 1200. Alternatively, the first component 2100 may be a general purpose processor and the second component 2200 may be an artificial intelligence dedicated processor. Alternatively, the first component 2100 may be at least one application and the second component may be an operating system (OS).

In this case, interface to transceive data (for example, composite image) between the first component 2100 and the second component 2200 may be defined.

For example, an application program interface (API) function having learning data to be applied to the data recognition model as a factor value (or an intermediate value or transfer value) may be defined. In this case, if the first component 2100 calls the API function and inputs a composite image as a data factor value, the API function may transfer the composite image to the second component 2200 as learning data to be applied to the data recognition model.

In FIG. 8B, the first component 2100 may receive a video (S811).

The first component 2100 may generate a composite image by superimposing at least a portion of the plurality of images on the basis of the common area included in each of the plurality of images constituting at least a part of the video (S813).

The first component 2100 may transmit the generated composite image to the second component 2200 (S815).

The second component 2200 may learn a data recognition model using the generated composite image (S817).

The second component 2200 may store the learnt data recognition model (S819).

In the above-described embodiment, it is described that the second component 2100 stores the learnt data recognition model. However, it is merely exemplary and the second component 2200 may transfer the learnt data recognition model to the first component 2100 so that the first component 2100 may store the data recognition model.

Also, although the first component 2100 is described as generating a composite image in the above-described exemplary embodiment, this is merely an example, and the second component 2200 may receive the input video and generate a composite image by superimposing at least a part of a plurality of images based on a common area which is included in each of a plurality of images constituting at least a part of a video.

Figure 9A:
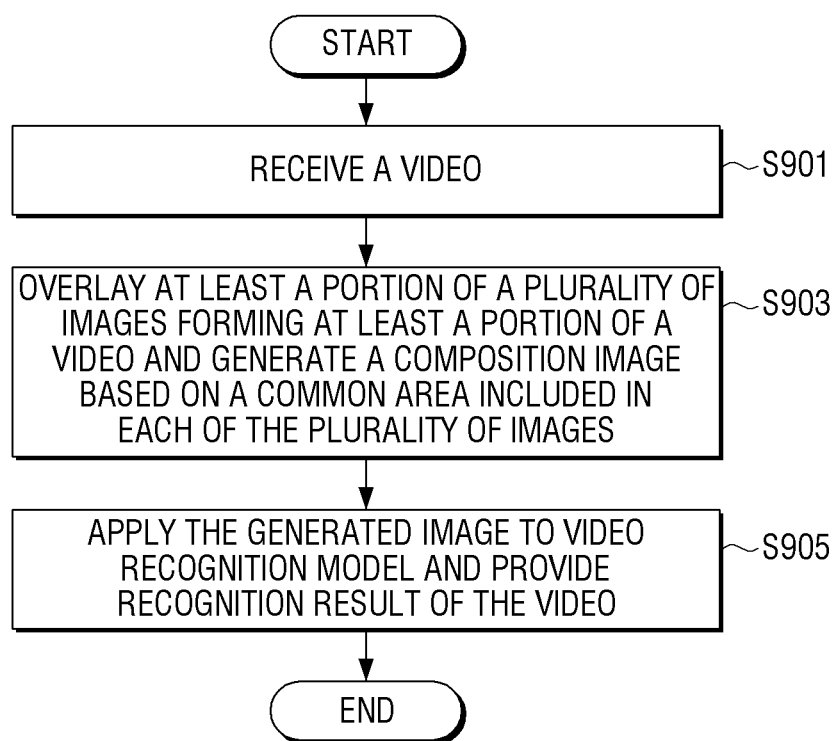
FIG. 9A is a flowchart indicating a method for recognizing data by a data recognition apparatus according to an exemplary embodiment.

FIG. 9A is a flowchart indicating a method for recognizing data by the data recognition apparatus 200 according to an exemplary embodiment. At this time, the data recognition apparatus 200 may be the electronic apparatus 700, but this is merely exemplary and the data recognition apparatus may be implemented as the server 1200.

In FIG. 9A, the data recognition apparatus 200 may receive a video (S901).

The data recognition apparatus 200 may overlay at least a portion of a plurality of images forming a portion of a video based on a common area included in each of the plurality of images and generate a composition image (S903).

According to various exemplary embodiments, the data recognition apparatus 200 may extract a common area from each of the plurality of images, overlay the extracted plurality of common areas, and generate a composition image.

According to various exemplary embodiments, the data recognition apparatus 200 may generate a composition image with reference to the center of gravity of common areas.

According to various exemplary embodiments, the data recognition apparatus 200 may overlay a common area and a background area around the common area of a plurality of images and generate a composition image.

According to various exemplary embodiments, the data recognition apparatus 200 may compensate a motion of a camera which photographs a video from each of a plurality of images, and generate a composition image based on a common area included in each of the plurality of images where a motion of the camera is compensated.

Referring back to FIG. 9A, the data recognition apparatus 200 may apply the generated composition image to the data recognition model and provide a recognition result of a video (S905).

Figure 9B:
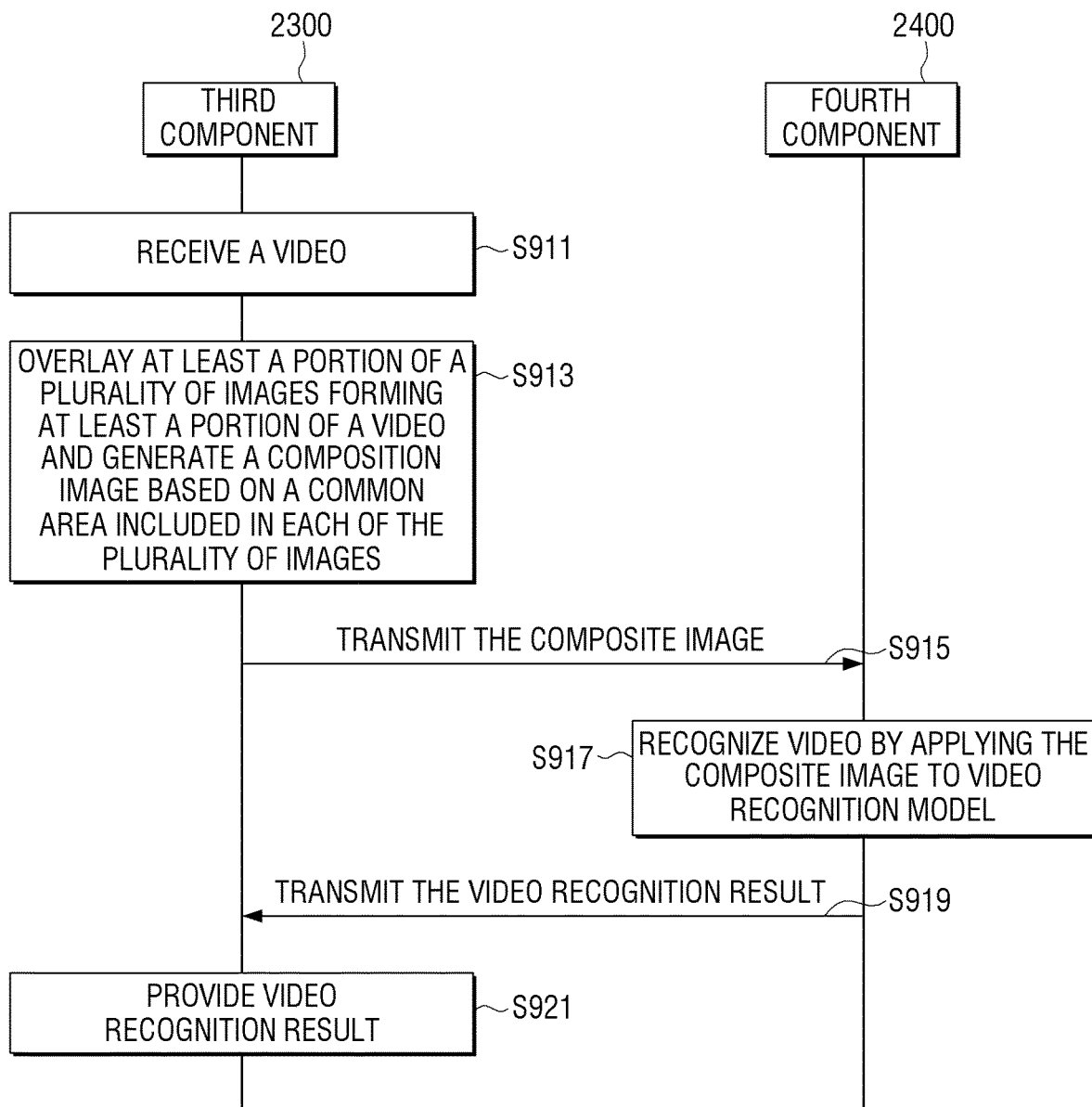
FIG. 9B is a sequence map illustrating a method for recognizing a data by a system including an electronic apparatus and a server according to an exemplary embodiment.

FIG. 9B is a flowchart illustrating a method for data recognition by a system for recognizing data using a data recognition model according to an exemplary embodiment of the present disclosure. At this time, the system for recognizing data using the data recognition model may include a third component 2300 and a fourth component 2400.

As an example, the third component 2300 may be the electronic apparatus 700 and the fourth component 2400 may be the server 1200. Alternatively, the third component 2300 may be a general purpose processor and the fourth component 2400 may be an artificial intelligence dedicated processor. Alternatively, the third component 2300 may be at least one application, and the fourth component 2400 may be an operating system.

In this case, an interface for transmitting/receiving data (e.g., video, composite image or video recognition result) between the third component 2300 and the fourth component 2400 may be defined.

For example, an API function having recognition data to be applied to the learnt data recognition model as a factor value (or an intermediate value or transfer value), and a recognition result of the data recognition model as an output value may be defined. In this case, if the third component 2300 calls the API function and inputs a composite image as a data factor value, the API function may transfer the composite image to the fourth component 2400 as learning data in which the composite image is to be applied to the data recognition model. When a video recognition result is received from the fourth component 2400, the third component 2300 may provide a video recognition result as an output value of the API function.

In FIG. 9B, the third component 2300 may receive a video (S911).

The third component 2300 may generate a composite image by superimposing at least a portion of the plurality of images on the basis of the common area included in each of the plurality of images constituting at least a part of the video (S913).

The third component 2300 may transmit the generated composite image to the fourth component 2400 (S915).

The fourth component 2400 may apply the generated composite image to the data recognition model and recognize a video (S917).

The fourth component 2400 may transmit a video recognition result to the third component 2300 (S919). The third component 2300 may provide a video recognition result (S921).

In the above-described embodiment, the third component 2300 is described as generating the composite image, but this is merely exemplary, and by receiving a video in which the fourth component 2400 is input, and based on a common area included in each of a plurality of images constituting at least a part of the video, at least a part of the plurality of images can be superimposed to generate a composite image.

FIG. 10A is a flowchart indicating a method for providing a service by the electronic apparatus 700 according to an exemplary embodiment. At this time, the data recognition apparatus 200 may be the electronic apparatus 700, but this is merely exemplary and the apparatus may be implemented as the server 1200.

In FIG. 10A, the electronic apparatus 700 may include the data recognition apparatus 200 and the service provider 250.

First of all, the electronic apparatus (00 may receive a video (S1001).

The electronic apparatus 700 may generate a composition image by overlaying at least a portion of a plurality of images forming at least a portion of a video based on a common area included in each of the plurality of images (S1003).

The electronic apparatus 700 may obtain a recognition result of the video by applying the generated composition image to the data recognition model (S1005).

The electronic apparatus 700 may provide a service based on the obtained recognition result of the video (S1007).

Figure 10B:
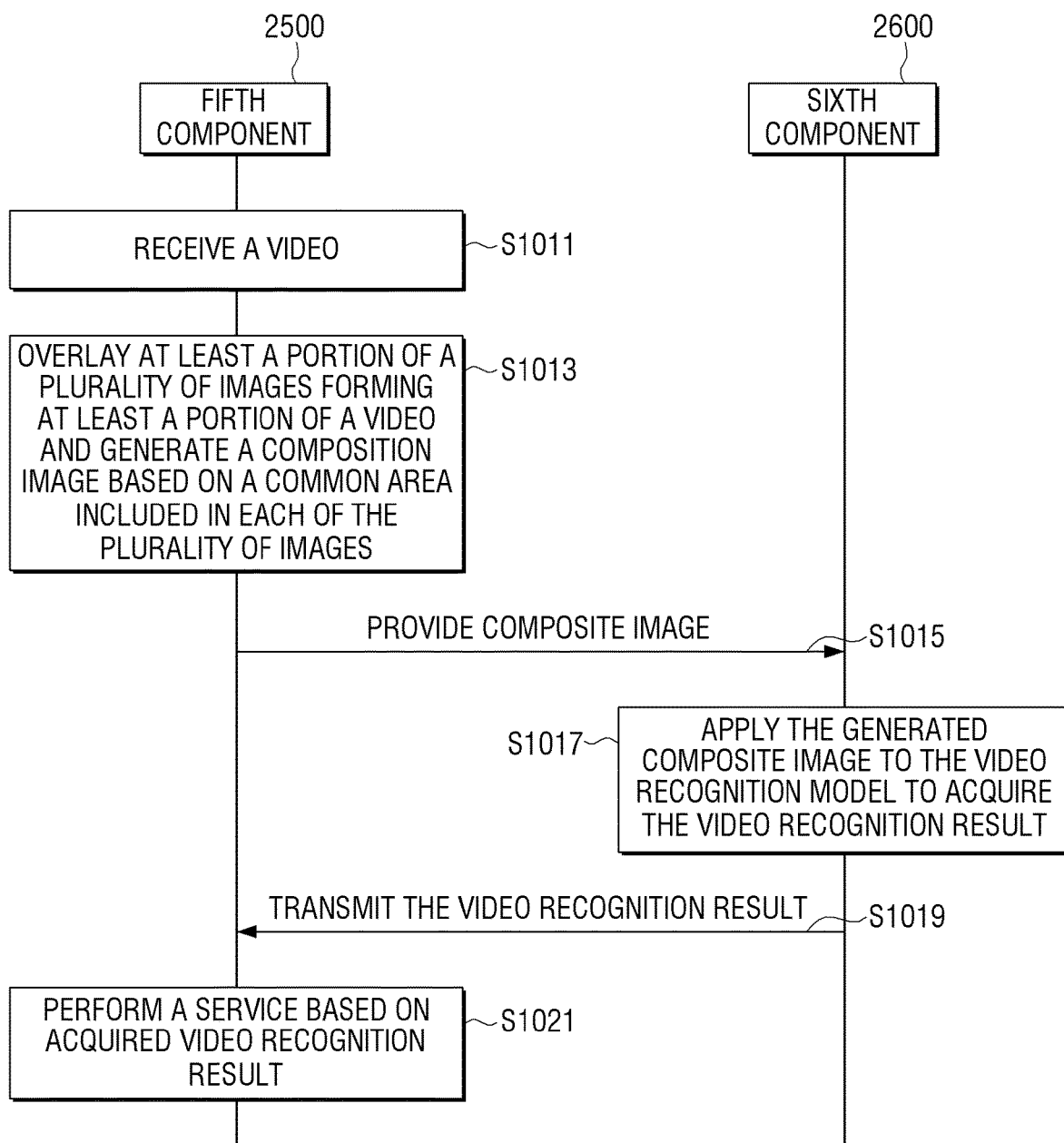
FIGS. 10B and 10C are sequence maps illustrating a method for providing a service by a system including an electronic apparatus and a server according to an exemplary embodiment.

FIG. 10B is a flowchart illustrating a method of providing a service by a system for recognizing data using a video recognition model according to an embodiment of the present disclosure. At this time, a system for recognizing data using a data recognition model may include a fifth component 2500 and a sixth component 2600.

In one example, the fifth component 2500 may be the electronic apparatus 700 and the sixth component 2600 may be the server 1200. Alternatively, the fifth component 2500 may be a general purpose processor and the sixth component 2600 may be an artificial intelligence dedicated processor. Alternatively, the fifth component 2500 may be at least one application, and the sixth component 2600 may be an operating system.

First of all, the fifth component 2500 may receive a video (S1011).

The fifth component 2500 may generate a composite image by superimposing at least a portion of the plurality of images on the basis of the common area included in each of the plurality of images constituting at least a part of the video (S1013).

The fifth component 2500 may transmit the generated composite image to the sixth component 2600 (S1015).

The sixth component 2600 may apply the generated composite image to the data recognition model and obtain a recognition result of a video (S1017).

The sixth component 2600 may transmit the obtained video recognition result to the fifth component 2500 (S1019).

The fifth component 2500 may perform a service based on the video recognition result (S1021).

In the above-described embodiment, it is described that the fifth component 2500 generates a composite image. However, this is merely an example, and the sixth component 2600 may receive the input video, and generate a composite image by superimposing at least a part of the plurality of images based on the common area included in each of the plurality of images constituting at least a part of the video.

Figure 10C:
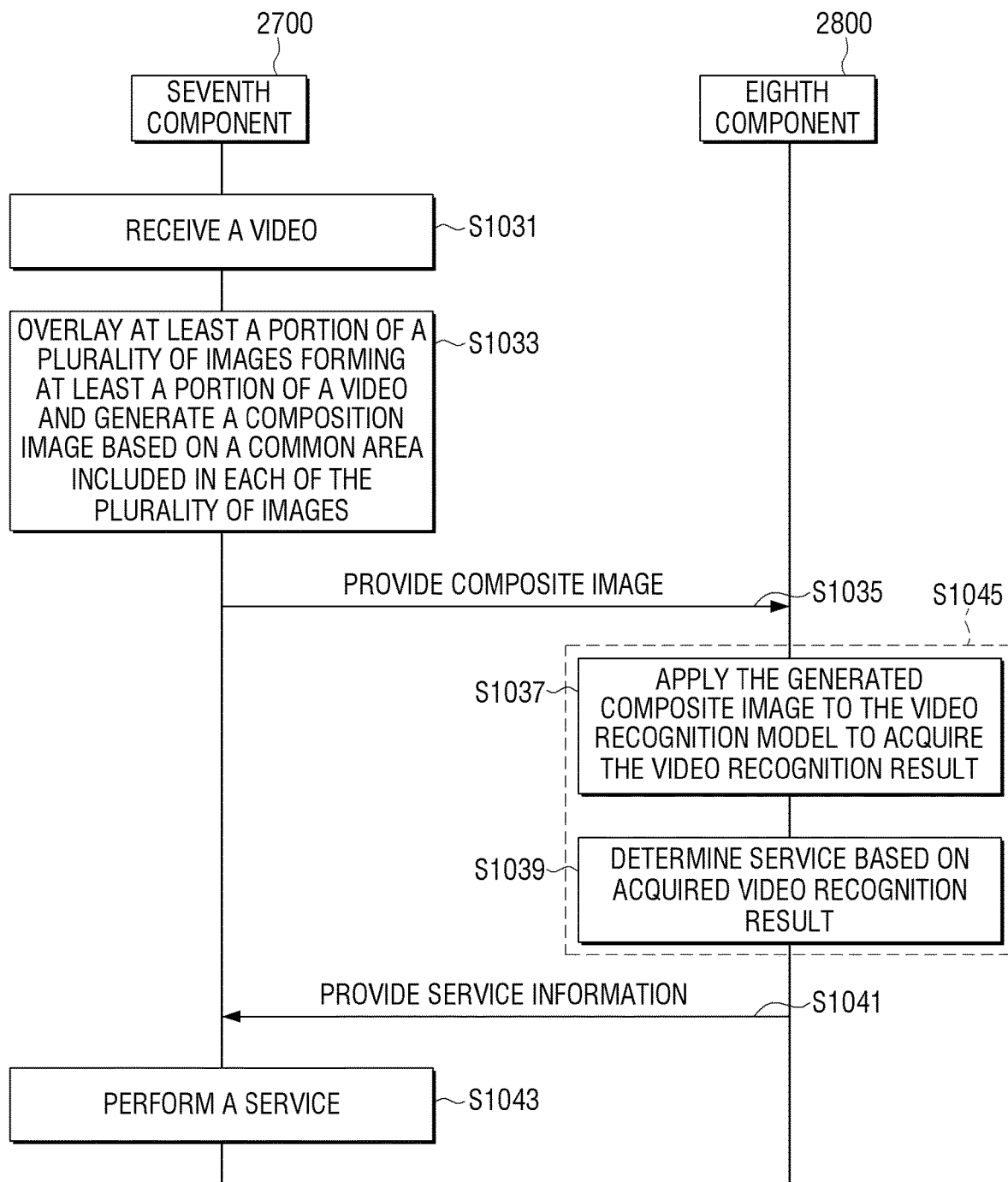

FIG. 10C is a flowchart illustrating a method of providing a service by a system for recognizing data using a video recognition model according to an embodiment of the present disclosure. At this time, the system for recognizing data using a data recognition model may include a seventh component 2700 and an eighth component 2800.

As an example, the seventh component 2700 may be the electronic apparatus 700 and the eighth component 2800 may be the server 1200. Alternatively, the seventh component 2700 may be a general purpose processor and the eighth component 2800 may be an artificial intelligence dedicated processor. Alternatively, the seventh component 2700 may be at least one application, and the eighth component 2800 may be an operating system.

The seventh component 2700 may receive a video (S1031).

The seventh component 2700 may generate a composite image by superimposing at least a portion of the plurality of images on the basis of the common area included in each of the plurality of images constituting at least a part of the video (S1033).

The seventh component 2700 may transmit the generated composite image to the eighth component 2800 (S1035).

The eighth component 2800 may apply the generated composite image to the data recognition model and obtain a video recognition result (S1037).

The eighth component 2800 may determine a service to be provided based on the obtained video recognition result (S1039).

The eighth component 2800 may transmit the determined information of the service to the seventh component 2700 (S1041).

The seventh component 2700 may perform a service based on information of a service (S1043).

In the above-described embodiment, the seventh component 2700 is described as generating a composite image but this is merely exemplary, and the eighth component 2800 may receive the input video, and generate a composite image by superimposing at least a part of the plurality of images on the basis of the common area included in each of the plurality of images constituting at least a part of the video.

In the above-described embodiment, the process of determining a service based on the video recognition result may be performed in a rule-based manner or may be performed in a neural network model or a deep learning model mode as an artificial intelligence technology. In this case, the eighth component may acquire information on the service to be provided by applying the motion recognition result to the data recognition model set to determine the service. In this case, the information on the service may include at least one of a recommendation application, content, data, and commands (for example, an application execution command, a module function execution command).

When a data recognition model providing a video recognition result is defined as a first data recognition model and a data recognition model providing information on a service is defined as a second data recognition model, the first data recognition model and the second data recognition models may be respectively implemented, or the first data recognition model and the second data recognition model may be integrated into one and implemented with one data recognition model (hereinafter, integrated data recognition model).

When the integrated data recognition model is implemented, in FIG. 10C, S1037 and S1039 may be operated as one operation S1045.

That is, the eighth component 2800 may apply the composite image to the integrated data recognition model to directly acquire information on the service to be provided to the user. Alternatively, the seventh component 2700 may apply the composite image to the integrated data recognition model to directly obtain information about the service to be provided to the user.

For this purpose, the integrated data recognition model may be constructed in advance in the data recognition model construction apparatus 100. The integrated data recognition model may be updated periodically or as needed, and the update condition of the integrated data recognition model may correspond to the update condition of the data recognition model of FIG. 2B, so redundant description is omitted.

The exemplary embodiments may be implemented as an S/W program including commands stored in a computer-readable storage media which may be read by computer.

The computer is an apparatus capable of calling stored commands from the storage medium and operating according to the disclosed embodiments according to the called commands, and may include an x-ray apparatus or an external server communicating with the x-ray apparatus according to the disclosed exemplary embodiments.

The computer-readable storage medium may be provided in the form of a non-transitory storage medium. Here, 'non-transitory' merely means that the storage medium does not include a signal, a current and is tangible, but does not distinguish whether data is stored semi-permanently or temporarily on a storage medium. By way of example, the non-transitory storage medium include not only non-transitory readable medium such as CD, DVD, hard disk, Blu-ray disc, USB, internal memory, memory card, ROM or RAM, but also temporarily stored medium such as a register, cache, buffer, etc.

In addition, a method according to the disclosed exemplary embodiments may be provided as a computer program product.

The computer program product may include a software program, a computer-readable storage medium storing the software program, or a product traded between a seller and a purchaser.

For example, a computer program product may include a product of an S/W program distributed electronically through a manufacturer of an X-ray device or an electronic market (e.g., Google Play Store, AppStore). For electronic distribution, at least a portion of the software program may be stored on a storage medium or may be created temporarily. In this case, the storage medium may be a manufacturer or a server of an electronic market, or a storage medium of a relay server.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A data recognition apparatus comprising:
   a video inputter configured to receive a video;
   an image composition unit configured to obtain at least one common object included in each of a plurality of images that form at least a portion of the video, and obtain a composition image by overlaying a plurality of common areas corresponding to the at least one common object with each other, each of the plurality of common areas being included in a corresponding image among the plurality of images and including the at least one common object, each of the plurality of images including a common area and a background; and
   a recognition result provider configured to provide a recognition result of the video by applying the obtained composition image to a data recognition model,
   wherein the image composition unit is configured to, based on an attribute of the background, selectively perform either a first operation of overlaying only the plurality of common areas or a second operation of overlaying the plurality of common areas and a plurality of backgrounds corresponding to the plurality of common areas, the first operation or the second operation being selected based on the attribute of the background.

2. The data recognition apparatus as claimed in claim 1, wherein the attribute of the background includes relevance between the common area and the background, and a ratio of an area corresponding to the background in the plurality of images.

3. The data recognition apparatus as claimed in claim 2, wherein the image composition unit is further configured to:
   based on the relevance between the common area and the background being greater than a first predetermined value perform the second operation of overlaying the plurality of common areas and the plurality of backgrounds corresponding to the plurality of common areas, and
   based on the relevance between the common area and the background being less than the first predetermined value perform the first operation of overlaying only the plurality of common areas.

4. The data recognition apparatus as claimed in claim 2, wherein the image composition unit is further configured to:
   based on the ratio of the area corresponding to the background in the plurality of images being greater than a second predetermined value perform the first operation of overlaying only the plurality of common areas, and
   based on the ratio of the area corresponding to the background in the plurality of images being less than the second predetermined value perform the second operation of overlaying the plurality of common areas and the plurality of backgrounds corresponding to the plurality of common areas.

5. The data recognition apparatus as claimed in claim 1, wherein each of the plurality of common areas is configured to include an identical or similar common object from each of the plurality of images.

6. The data recognition apparatus as claimed in claim 1, wherein the recognition result of the video comprises state information of an object included in the video or information of a surrounding state of the object.

7. The data recognition apparatus as claimed in claim 1, wherein the data recognition model is a neural network model or a deep learning model which performs computing based on a connection relation among a plurality of network nodes and a weighted value of each of the plurality of network nodes.

8. The data recognition apparatus as claimed in claim 1, wherein the image composition unit obtains the composition image based on a center of gravity of the common area.

9. The data recognition apparatus as claimed in claim 1, wherein the image composition unit obtains the composition image by overlaying the common area and a background area around the common area included in each of the plurality of images.

10. The data recognition apparatus as claimed in claim 1, wherein the image composition unit is configured to compensate a motion of a camera which photographs the video from each of the plurality of images, and obtain the composition image based on the common area included in each of a plurality of motion compensated images.

11. The data recognition apparatus as claimed in claim 1, further comprising a model update unit which identifies whether the data recognition model is updated and updates the data recognition model according to an identification result.

12. The data recognition apparatus as claimed in claim 1, further comprising a service provider which provides a service based on a result of recognition of the video.

* * * * *